US010193721B2

(12) United States Patent
Huomo

(10) Patent No.: US 10,193,721 B2
(45) Date of Patent: Jan. 29, 2019

(54) METHOD, APPARATUS AND COMPUTER PROGRAM FOR TRANSMITTING AND/OR RECEIVING SIGNALS

(71) Applicant: Reactive Technologies Limited, Oxford (GB)

(72) Inventor: Heikki Huomo, Oulu (FI)

(73) Assignee: Reactive Technologies Limited, Oxford (GB)

(*) Notice: Subject to any disclaimer, the term of this patent is extended or adjusted under 35 U.S.C. 154(b) by 0 days.

(21) Appl. No.: 14/851,551

(22) Filed: Sep. 11, 2015

(65) Prior Publication Data
US 2016/0006591 A1 Jan. 7, 2016

Related U.S. Application Data

(63) Continuation of application No. PCT/EP2014/053430, filed on Feb. 21, 2014.

(30) Foreign Application Priority Data

Mar. 15, 2013 (GB) .................................. 1304828.5
Apr. 16, 2013 (GB) .................................. 1306894.5

(51) Int. Cl.
*H04B 3/54* (2006.01)
*H04L 27/20* (2006.01)
(Continued)

(52) U.S. Cl.
CPC ............. *H04L 27/20* (2013.01); *H04B 3/542* (2013.01); *H04L 27/2655* (2013.01);
(Continued)

(58) Field of Classification Search
CPC ... H04N 2203/5404; H04N 2303/5412; H04N 2303/5416; H04N 3/54; H04N 3/542
(Continued)

(56) References Cited

U.S. PATENT DOCUMENTS

| 2003/0156013 A1* | 8/2003 | Bub | H04B 3/54 375/259 |
| 2004/0037221 A1* | 2/2004 | Aisa | H02J 13/0048 370/229 |

(Continued)

FOREIGN PATENT DOCUMENTS

| JP | 2001503954 A | 3/2001 |
| JP | 2003525005 A | 8/2003 |

(Continued)

OTHER PUBLICATIONS

Douglass, P.J.; Shi You; Heussen, K., "Broadcast Communication by system frequency modulation," Smart Grid Communications (SmartGridComm), 2012 IEEE Third International Conference on, vol., No., pp. 199, 204, Nov. 5-8, 2012.

(Continued)

*Primary Examiner* — Kevin M Burd
(74) *Attorney, Agent, or Firm* — EIP US LLP

(57) ABSTRACT

Methods, apparatus and computer programs for transmitting and/or receiving information are described. Information encoded in a carrier signal comprising a modulation pattern superimposed on a grid frequency at which electricity flows in a synchronous area of an electric power grid, is decoded by measuring, at a receiving device, a characteristic relating to a frequency of electricity flowing in the electric power grid, accessing data indicative of one or more predetermined code patterns and performing a correlation process to determine a correlation between the modulation pattern and one of the one or more predetermined code patterns. The information is decoded on the basis of the determined correlation. This enables information to be easily transmitted within a synchronous area of the electric power grid.

51 Claims, 9 Drawing Sheets

(51) Int. Cl.
*H04L 27/26* (2006.01)
*H04W 24/08* (2009.01)

(52) U.S. Cl.
CPC ..... *H04W 24/08* (2013.01); *H04B 2203/5404* (2013.01); *H04B 2203/5412* (2013.01)

(58) Field of Classification Search
USPC ........................................................ 375/295
See application file for complete search history.

(56) References Cited

U.S. PATENT DOCUMENTS

| | | | | |
|---|---|---|---|---|
| 2009/0296667 | A1* | 12/2009 | Tajima | H04W 74/0866 |
| | | | | 370/336 |
| 2012/0091909 | A1* | 4/2012 | Wernars | H04B 3/54 |
| | | | | 315/246 |
| 2013/0038143 | A1* | 2/2013 | Koanantakool | H02J 9/005 |
| | | | | 307/143 |

FOREIGN PATENT DOCUMENTS

| | | | |
|---|---|---|---|
| JP | 20009077479 | A | 4/2009 |
| JP | 2010028788 | A | 2/2010 |
| WO | 2002044853 | A2 | 6/2002 |
| WO | 2006133152 | A2 | 12/2006 |
| WO | 2009149461 | A2 | 12/2009 |
| WO | WO 2009149461 A2 * | 12/2009 | ............ G01D 4/004 |
| WO | 2010150169 | A1 | 12/2010 |

OTHER PUBLICATIONS

Chinese Office Action dated Dec. 20, 2016 for Chinese Application No. 201480028032.0.

\* cited by examiner

METHOD, APPARATUS AND COMPUTER PROGRAM FOR TRANSMITTING AND/OR RECEIVING SIGNALS

CROSS-REFERENCE TO RELATED APPLICATIONS

This application is a continuation of International Application No. PCT/EP2014/053430, filed Feb. 21, 2014, which claims priority to foreign patent application no. GB 1304828.5, filed on Mar. 15, 2013, and foreign patent application no. GB 1306894.5, filed on Apr. 16, 2013. Each of the above-referenced patent applications is incorporated by reference in its entirety.

BACKGROUND OF THE INVENTION

Field of the Invention

The present invention relates to methods, apparatus and computer programs for transmitting and/or receiving signals within an electric power grid.

Description of the Related Technology

Communication systems for transmitting and/or receiving data across an electric power grid are known. Transmitting data across an electric power grid is advantageous because it uses existing infrastructure as the transmission medium. Since most premises that need a communications link are already connected to the electric power grid, a user may connect to the communications link without any additional infrastructure being required. Furthermore, the number of users already connected to the electric power grid, and the number of points at which one can connect to the electric power grid, is large, and therefore the infrastructure of the electric power grid provides a flexible network over which communication can be established.

Typically, in such a communication system, a data signal comprising a modulated carrier wave is superimposed onto an AC power signal. Typically, the superimposed data signal is modulated at a frequency much higher than a grid frequency of the electric power grid. For example, a data signal in the frequency range kHz to MHz may be superimposed on a mains signal with a grid frequency of nominally 50 or 60 Hz.

Such methods for transmitting and/or receiving data within an electric power grid are often limited in range because conventional power lines that carry the AC power signal and therefore carry the data signal are designed to be efficient at mains frequencies and tend to attenuate frequencies higher than the grid frequency. Furthermore, other components in the infrastructure of the electric power grid, such as transformers, are also designed to operate at mains frequencies and consequently do not transmit higher frequency signals efficiently. Therefore, it is usually necessary to provide a route around such electric power grid components to prevent loss in signal strength and/or reduction in quality of the data signals. This adds cost and complexity to a communications system that is intended to make use of existing infrastructure.

Systems causing variations in the fundamental frequency of the supply, which can be detected, are also known. Such systems typically control the rotational speed of turbines that are supplying power to the grid in order to cause a change to the nominal frequency. Due to the inertia of the so-called "spinning generation" changes to a nominal frequency of the grid are relatively slow (in the order of tens of seconds). Furthermore, the frequency variations must be readily distinguishable from background variations from the nominal grid frequency that are typical in electric power grids (referred to hereinafter as noise), which typically requires the fundamental frequency to be varied by 100 mHz or more. This reduces the number of available frequency states because grid operators are obliged to control frequency to within specified limits (typically within a few percent of the nominal grid frequency) and states falling outside those limits will trigger a frequency stabilizing response, such as load shedding or connection of generation reserves.

It is an object of the present invention to at least mitigate some of the problems of the prior art.

SUMMARY

According to a first aspect of the present invention, there is provided a method of decoding, at a receiving device, information encoded in a carrier signal and transmitted within a synchronous area of an electric power grid, the carrier signal comprising an alternating current, or alternating voltage, of electric power flowing in the electric power grid in accordance with a grid frequency, the method comprising:

measuring, at the receiving device, a characteristic relating to a frequency of the electric power flowing in the electric power grid;

accessing data indicative of one or more predetermined code patterns;

performing a correlation process, at the receiving device, to determine a correlation between at least a portion of a modulation pattern of the measured frequency characteristic and at least one of the one or more predetermined code patterns, the modulation pattern comprising a frequency pattern superimposed on the grid frequency; and decoding information encoded in the carrier signal on the basis of the determined correlation.

In some embodiments, the receiving device comprises a data store storing the one or more predetermined code patterns, and the method comprises accessing the data store to access the one or more predetermined code patterns.

In some embodiments, the receiving device comprises a data store storing one or more identifiers, and said modulation pattern includes an identifier of a receiving device or group of receiving devices, and the method comprises: determining whether the identifier included in the modulation pattern corresponds to one or more of the one or more identifiers stored in the data store; and processing the received signal on the basis of the determination.

In some embodiments, the decoding comprises extracting data from the signal in response to determining that the identifier included in the signal corresponds to one or more of the one or more identifiers stored in the data store.

In some embodiments, the receiving device comprises a data store comprising data indicating one or more predefined actions, and the method comprises performing said one or more predefined actions in response to a determination that the identifier included in the modulation pattern corresponds to one or more of the one or more identifiers stored in the data store.

In some embodiments, the one or more predefined actions include one or more of: altering a setting of the receiving device; altering a setting of a power device associated with the receiving device; executing a program on the receiving device; stopping a program on the receiving device; and storing data in a data store of the receiving device.

In some embodiments, the modulation pattern comprises timing information and further information, different from the timing information, and the method comprises processing the further information on the basis of the timing information. The modulation pattern may comprise a phase shift key, and the method may comprise extracting the timing information from the modulation pattern on the basis of the phase shift key.

In some embodiments, the method comprises monitoring, at the receiving device, a number of cycles of the electric power flow in the grid that have elapsed from a given start point; and determining timing information for the correlation process on the basis of said monitoring.

In some embodiments, the method comprises performing the correlation process according to a predetermined schedule, the schedule identifying a timing for the performance of correlation process on the basis of a number of cycles of the electric power flow that have elapsed from a given start point.

In some embodiments, the modulation pattern comprises information indicating a number of cycles of said electric power flow that have elapsed from a given start point.

In some embodiments, the correlation process comprises a filtering process.

In some embodiments, the correlation process comprises correlating a time-base of the modulation pattern with a time-base of the one or more predetermined code patterns.

In some embodiments, the correlation process comprises a correlating a bit pattern of the modulation pattern with a bit pattern of the one or more predetermined code patterns.

In some embodiments, the correlation process comprises extracting data transmitted by a plurality of transmitting devices and determining from which of the plurality of transmitting devices the extracted data was transmitted.

In some embodiments, data transmitted by different ones of the plurality of transmitting devices is received at the receiving device at different times.

In some embodiments, the method comprises maintaining a database storing identifiers of the plurality of transmitting devices and comparing identification data extracted from the modulation pattern with said stored identifiers of the plurality of transmitting devices.

In some embodiments, the method comprises:

determining that data is received from two or more of the plurality of transmitting devices within a predefined timeframe; and transmitting a request to each of said two or more transmitting devices to retransmit said data in response to determining that data has been received from said two or more receiving devices within said time-frame.

In some embodiments, the method comprises transmitting an acknowledgement to a given one of the plurality of transmitting devices in response to determining that data has been received from that transmitting device.

In some embodiments, the receiving device comprises a communications interface for receiving communications via a further communications medium, different from the electric power grid, and the method comprises initiating communications with a further device via the further communications medium in response to decoding of said information.

In some embodiments, the receiving device comprises a communications interface for communications via a further communications medium, different from the electric power grid, and the method comprises:

sending a request message to a further device via the communications to initiate communications therewith, whereby said further device initiates said modulation pattern to encode said information for decoding by the receiving device; and the receiving device communicating with the further device via the communications medium on the basis of the decoded information.

In some embodiments, the modulation pattern comprises authentication data for authenticating the receiving device to the further device to initiate communications via the further communications medium.

In some embodiments, the method comprises transmitting the authentication data from the receiving device to the further device to initiate communications via the further communications medium.

In some embodiments, the modulation pattern comprises configuration data for configuring the receiving device to receive data from the further device via the further communications medium.

In some embodiments, the further communications medium is an Internet Protocol (IP) based communications medium.

In some embodiments, the grid frequency is subject to random noise fluctuations such that the grid frequency varies over time within a frequency range and the modulation pattern has a frequency variation with respect to the grid frequency that is less than said frequency range.

According to a second aspect of the present invention, there is provided a receiving device for decoding information encoded in a carrier signal and transmitted within a synchronous area of an electric power grid, the carrier signal comprising an alternating current, or alternating voltage, of electric power flowing in the electric power grid in accordance with a grid frequency, the receiver comprising:

a measuring means arranged to measure a characteristic relating to a frequency of the electric power flowing in the electric power grid;

access to a data store arranged to store data indicative of one or more predetermined code patterns; and a processing means arranged to perform a correlation process to determine a correlation between at least a portion of a modulation pattern of the measured frequency characteristic and at least one of the one or more predetermined code patterns, the modulation pattern comprising a frequency pattern superimposed on the grid frequency, and to decode information encoded in the carrier signal on the basis of the determined correlation.

The receiving device of the second aspect may be adapted to provide features corresponding to any of those of the first aspect.

According to a third aspect of the present invention, there is provided a method of transmitting information within a synchronous area of an electric power grid, the electric power grid comprising one or more power devices arranged to provide electric current to and/or consume electric current from the electric power grid via respective one or more connections between the power devices and the electric grid, electricity flowing in the electric power grid in accordance with a grid frequency, the method comprising:

modulating, using modulating devices at the one or more connections, a flow of power between the electric power grid and the one or more power devices in accordance with a control pattern representing information to be transmitted, the modulation resulting in a modulation pattern being superimposed on the grid frequency to provide a carrier signal having said information encoded therein.

In some embodiments, each of a distributed group of power devices is connected to the electric power grid, and the method comprises modulating power flow to and/or from each of the plurality of power devices in accordance with the control pattern, such that the consumption and/or provision of power by the plurality of power devices is coordinated to provide a collective carrier signal that is detectable by the one or more receiving devices.

By modulating power flow to and/or from each of the plurality of power devices in accordance with the control pattern, a collective frequency modulated signal can be generated using modulated power flow to/from relatively small (low power) power devices that is detectable by the one or more receiving devices. This enables the frequency modulated signal to be generated using relatively inexpensive switching devices, such as semiconductor based switches.

In some embodiments, the method comprises receiving, from a controller arranged to generate data indicative of the information that is to be transmitted across the electric power grid, first data indicative of first information to be transmitted; and generating the control pattern on the basis of the received first data.

In some embodiments, data from the controller is received via an external communications network.

In some embodiments, the method comprises including in the carrier signal one or more identifiers corresponding to said one or more receiving devices.

In some embodiments, the control pattern represents a sequence of control signals for controlling a switch, the switch being arranged to turn power flow to and/or from the power device on or off in accordance with a control signal, and the method comprises controlling the switch in accordance with the sequence of control signals.

In some embodiments, the method comprises controlling an attenuator to modulate power flow to and/or from the power unit.

In some embodiments, the modulation of power flow comprises modulating a reactive power flow.

In some embodiments, control pattern defines a bit pattern of data, and the carrier signal comprises a digital signal.

In some embodiments, the carrier signal comprises an analogue signal.

In some embodiments, the carrier signal includes identification data relating to a specific receiving device to which information is to be transmitted.

In some embodiments, the identification data is only available to said device and to said specific receiver.

In some embodiments, the identification data comprises a plurality of identifier types, each identifier type relating to a different property of the receiving device.

In some embodiments, the plurality of identifier types include one or more of: a geographical location, a device operating characteristic, an ownership group, a network address, a network address range, a telephone area code and a telephone number.

In some embodiments, each of the one or more power devices provide non-spinning power generation for the electric power grid.

In some embodiments, each of the one or more power devices is a power consuming device.

In some embodiments, the grid frequency is subject to random noise fluctuations such that the grid frequency varies over time within a frequency range, and the method comprises modulating the power flow between the electric power grid and the one or more power devices to provide a modulation pattern having a frequency variation with respect to the grid frequency that is less than said frequency range.

In some embodiments, the method comprises modulating a flow of power between a first one of the plurality of power devices and the electric power grid at a different time to modulating a flow of power flow between a second one of the plurality of power devices and the electric power grid.

According to a fourth aspect of the invention, there is provided a method of transmitting information within a synchronous area of an electric power grid, the electric power grid being connected to a plurality of distributed power devices arranged to consume electric power from the electric power grid, electricity flowing in the electric power grid in accordance with a grid frequency, the method comprising:

modulating power flow to the distributed power devices in accordance with a control pattern representing information to be transmitted, thereby modulating the grid frequency to provide a frequency modulated signal corresponding to said information for receipt at one or more receiving devices arranged to detect a frequency modulated signal in said electric power grid.

According to a fifth aspect of the invention, there is provided a method of transmitting information within a synchronous area of an electric power grid, the electric power grid comprising one or more power devices arranged to provide non-spinning electric power generation for the electric power grid and/or consume electric power from the electric power grid, electricity flowing in the electric power grid in accordance with a grid frequency, the method comprising:

modulating power flow to and/or from one or more power devices in accordance with a control pattern representing information to be transmitted, thereby modulating the grid frequency to provide a frequency modulated signal corresponding to said information for receipt at one or more receiving devices arranged to detect a frequency modulated signal in said electric power grid.

According to a sixth aspect of the present invention, there is provided a device for use in transmitting information within a synchronous area of an electric power grid, the electric power grid comprising one or more power devices arranged to provide electric current to and/or consume electric current from the electric power grid via respective one or more connections between the power devices and the electric grid, electricity flowing in the electric power grid in accordance with a grid frequency, the device comprising:

a communications interface arranged to receive data corresponding to information that is to be transmitted to a receiver connected to said synchronous area of the power grid;

a processor arranged to generate, on the basis of the received data, a sequence of control signals corresponding to the information that is to be transmitted; and a power flow modulator at the one or more connections arranged to modulate, on the basis of the generated sequence of control signals, a flow of power between the electric power grid and the one or more power devices, the modulation resulting in a modulation pattern being superimposed on the grid frequency to provide a carrier signal having said information encoded therein.

The device of the sixth aspect may be adapted to provide features corresponding to any of those of the third aspect.

Transmitting and/or receiving information via the modulation of a grid frequency enables information to be easily transmitted within a synchronous area of the electric power grid. For example, information may be transmitted across one or more transformers.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
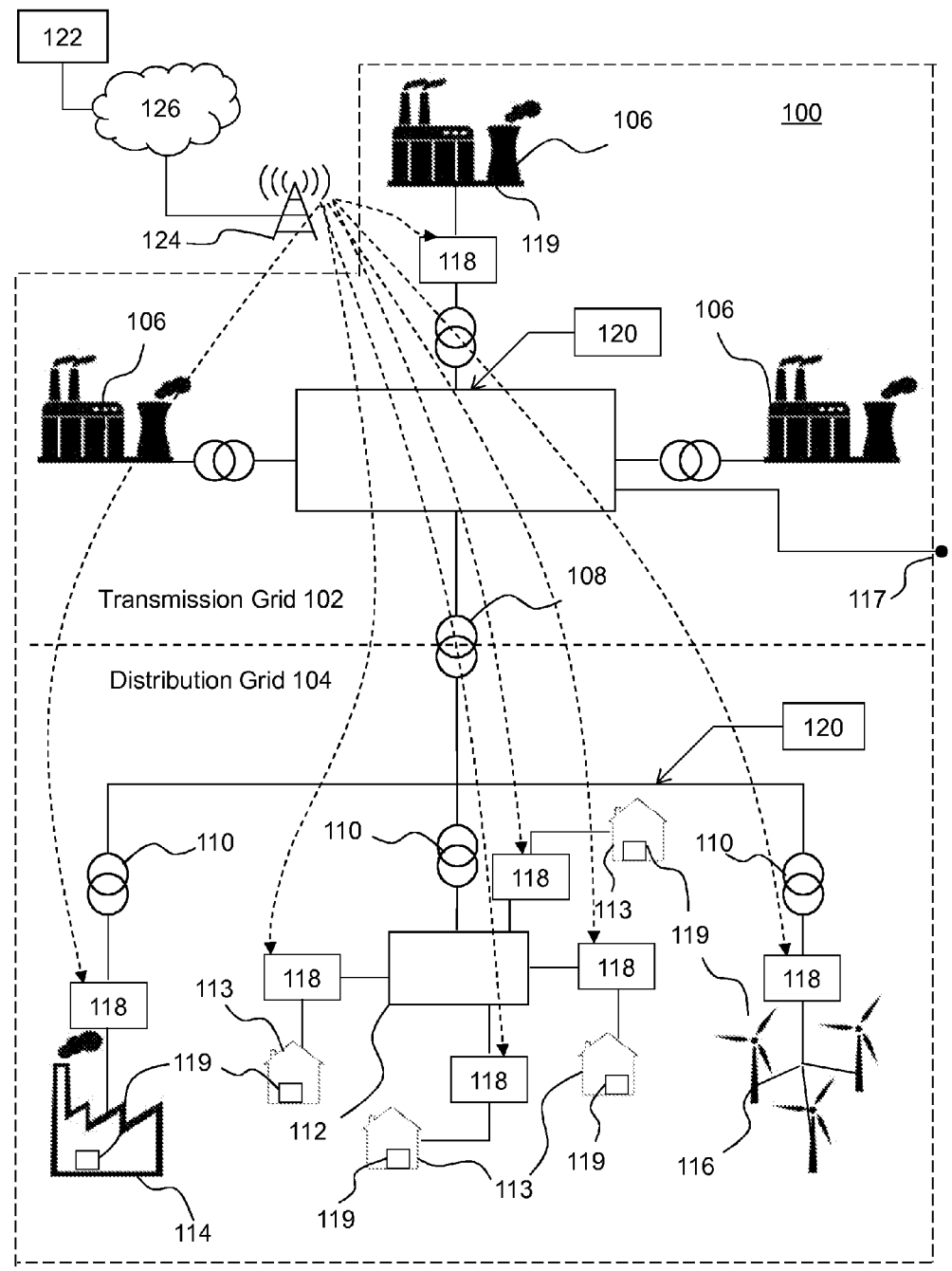
FIG. 1 is a schematic diagram illustrating a synchronous electric power grid in which the invention may be implemented.

FIG. 1 shows an exemplary electric power grid 100 in which an embodiment of the present invention may be implemented. The electric power grid 100 comprises a transmission grid 102 and a distribution grid 104.

The transmission grid 102 is connected to power generators 106, which may be nuclear plants or gas-fired plants, for example, from which it transmits large quantities of electrical energy at very high voltages (typically of the order of hundreds of kV), over power lines such as overhead power lines, to the distribution grid 104.

The transmission grid 102 is linked to the distribution grid 104 via a transformer 108, which converts the electric supply to a lower voltage (typically of the order of 50 kV) for distribution in the distribution grid 104.

The distribution grid 104 is connected via substations 110 comprising further transformers for converting to still lower voltages to local networks which provide electric power to power consuming devices connected to the electric power grid 100. The local networks may include networks of domestic consumers, such as a city network 112, that supply power to domestic appliances within private residences 113 that draw a relatively small amount of power in the order of a few kW. The local networks may also include industrial premises such as a factory 114, in which larger appliances operating in the industrial premises draw larger amounts of power in the order of several kW to MW. The local networks may also include networks of smaller power generators such as wind farms 116 that provide power to the electric power grid.

Although, for conciseness, only one transmission grid 102 and one distribution grid 104 are shown in FIG. 1, in practice a typical transmission grid 102 supplies power to multiple distribution grids 104 and one transmission grid 102 may also be interconnected to one or more other transmission grids 102.

Electric power flows in the electric power grid 100 as alternating current (AC), which flows at a system frequency, which may be referred to as a grid frequency (typically the grid frequency is nominally 50 or 60 Hz, depending on country). The electric power grid 100 operates at a synchronized frequency so that the frequency is substantially the same at each point of the grid.

The grid frequency typically varies with respect to a nominal grid frequency over time due to normal variations in the balance between the supply and consumption of power in the grid (i.e. variation that is not due to sudden unexpected increases in demand or loss of generation capacity). The normal variation of grid frequency appears as noise with respect to the nominal grid frequency when the grid frequency is observed over a period of time. The amount of normal variation (hereinafter referred to as noise) in a given synchronous grid is a range of frequencies that depends on the potential energy stored in that synchronous grid (i.e. the inertia of power devices connected to the grid); this may be determined for a given synchronous grid by, for example, making a series of measurements of the grid frequency over a period of time. Grids having higher inertia (i.e. relatively larger amounts of spinning generation) tend to be more stable and therefore less noisy, while grids having lower inertia (i.e. relatively smaller amounts of spinning generation) tend to be less stable and therefore more noisy. For most electric power grids the level of noise is typically in the range of 10 to 200 mHz.

The electric power grid 100 may include one or more direct current (DC) interconnects 117 that provide a DC connection between the electric power grid 100 and other electric power grids. Typically, the DC interconnects 117 connect to the transmission grid 102 of the electrical power grid 100. The DC interconnects 117 provide a DC link between the various electric power grids, such that the electric power grid 100 defines an area which operates at a given, synchronized, grid frequency that is not affected by changes in the grid frequency of other electric power grids. For example, the UK transmission grid is connected to the Synchronous Grid of Continental Europe via DC interconnects.

The electric power grid 100 also includes one or more devices for use in transmission of information (herein referred to as "transmitters" 118). Transmission of information, hereinafter referred to as data transmission, may be transmission of digital or analogue data and/or other types of information. Each transmitter 118 is associated with a power device 119 (which may consume power from or provide power to the electric power grid 100) or a group of power devices and is located at a connection between the power device 119 (or group of devices 119) and the electric power grid 100. Each transmitter 118 is arranged to modulate a flow of power between the power device 119 (or group of power devices 119) and the electric power grid 100. The transmitters 118 may be provided separately to, and/or installed on, the power devices 119. The power devices 119 may include power generators 106, appliances in residential premises 113 or industrial premises 114 and/or a small-scale power generators such as wind turbines 116 or solar panels.

The one or more transmitters 118 may be located at power devices 119 in the distribution grid 104 or in the transmission grid 102, or at any other location of the electric power grid 100. The transmitters 118 operate with the power devices 119 to transmit data within the electric power grid 100. Although, for the sake of simplicity, only seven transmitters 118 are shown in FIG. 1, it will be understood that, in practice, the electric power grid 100 may comprise hundreds or thousands of such devices, depending upon the capacity of power devices 119 with which the transmitters 118 are associated.

Where transmitters 118 are associated with large capacity power devices 119 (such as a power device in an industrial premises) there may only be a small number of transmitters 118. In some embodiments, there may only be one transmitter 118.

The transmitters 118 may be distributed among a relatively large number of smaller capacity power devices 119 (each providing a few W to tens of kW, such that the contribution to the transmission of each power device 119 is smaller but so that the combined transmission signal has the same strength. Distribution of the transmitters 118 has the advantage that the switching of smaller loads can be performed without the need for expensive power switching apparatus (switching can instead be performed with semiconductor-based switches, for example), and the switching of smaller loads only introduces a relatively small amount of voltage noise into the local grid environment, for example, within agreed limits that grid operators are obliged to maintain supply voltage in the distribution grid 104 within.

Typically, the total modulated load required to transmit data across the electric power grid 100 is dependent on the particular coding scheme used for transmitting information as described below. Different coding schemes result in different amounts of gain at the receivers 120 and hence the required power for modulation may range from W to MW.

The transmitters 118 at the connections each modulate the flow of power between respective associated power devices 119 and the electric power grid 100 according to a pattern defined by the information that is to be transmitted. Each of the one or more transmitters 118 is synchronized with each of the other transmitters 118 and is arranged to modulate power flow according to a control pattern such that the transmitters 118 cause a collective modulation of the power flow in the electric power grid 100. That is, the transmitters 118 collectively cause a modulated change in power balance in the electric power grid 100, the change in power balance being the combined effect of the modulated power flow to/from each of the power devices 119 that have an associated transmitter 118.

Modulating power flowing between the power devices 119 and the electric power grid 100 at the connection, rather than by varying the power output or directly varying the frequency of, for example, a turbine having a high inertia, enables power flow to be modulated at a much higher rate. This enables a modulation pattern to be superimposed on the grid frequency, as described below with reference to FIGS. 4a and 4b, at a higher rate of modulation, which in turns enable a higher data transmission rate.

The transmitters 118 may be arranged to modulate a reactive power flow to and/or from their associated power devices 119. For example, the transmitters 188 may include inverters for modifying a reactive power contribution of their associated power devices 119. Modulating the reactive power contribution of the power devices causes a local modulation of the efficiency of the electric power grid 100 with a corresponding modulation of the available real power. In turn, this causes a modulation of the grid balance which as described above causes a modulation of the grid frequency.

In certain embodiments the transmitters 118 may be arranged to modulate just real power, just reactive power, or both real and reactive power.

Figure 2:
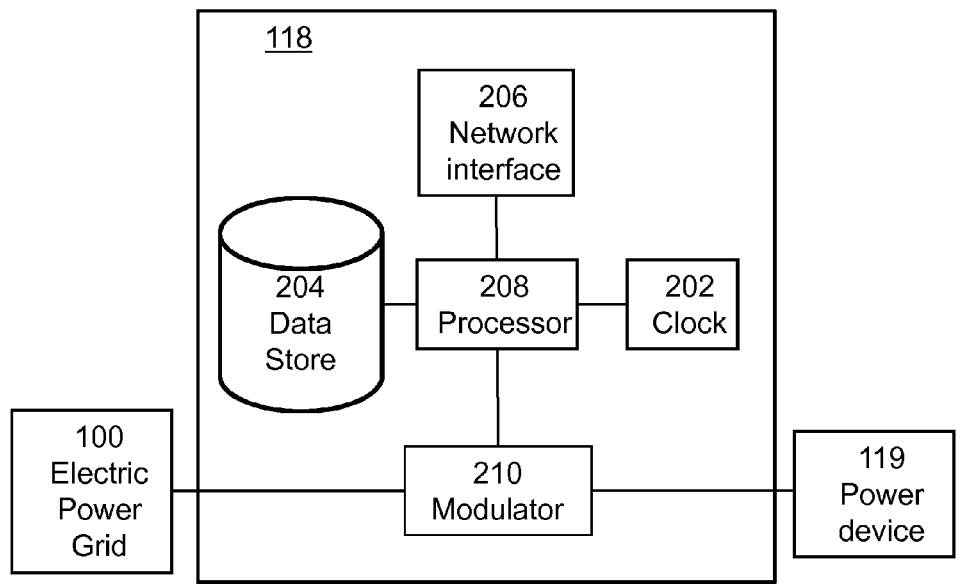
FIG. 2 is a schematic diagram illustrating a transmitter in accordance with an embodiment of the present invention.

FIG. 2 shows an exemplary arrangement of a transmitter 118 for transmitting data within an electric power grid 100. The transmitter 118 operates with one or more power devices 119 to transmit data within the electric power grid 100 and comprises a clock 202, a data store 204, a network interface 206, a processor 208, and a modulator 210.

The transmitter 118 is arranged to receive data from a controller 122. The controller may not be directly connected to the electric power grid 100 but instead the data may be received via the network interface 206. The network interface 206 is arranged to receive information via a fixed or wireless communications network, which may include one or more of Global System for Mobile Communications (GSM), Universal Mobile Telecommunications System (UMTS), Long Term Evolution (LTE), fixed wireless access (such as IEEE 802.16 WiMAX), and wireless networking (such as IEEE 802.11 Wi-Fi).

Information received via the network interface 206 may be stored in the data store 204. Information stored in the data store 204 may include representations of data that is to be transmitted by the transmitter 118 (referred to herein as "codes"). The codes may represent control signals for controlling the modulator 210 according to a predefined control pattern.

The processor 208 is arranged to retrieve data that is to be transmitted from the data store 204 and to generate control signals for controlling the modulator 210. The processor 208 accesses the data store 204, retrieves a code and, based on the code, generates control signals and sends those control signals to the modulator 210 to control power flow to/from a power device 119. The control signals may be in the form of a bit pattern of data that is to be transmitted in the electric power grid 100. The code typically defines a time-varying pattern of control signals provided with reference to the clock 202. The clock 202 may be synchronized with the clocks of other transmitters 118 in order that each of the transmitter 118 connected to the electric power grid 100 is synchronized with each other transmitter 118. This enables transmissions of data to be initiated at each transmitter at the same time. Synchronization of the clock 204 may be performed on the basis of a synchronization signal received via the network interface 206 as described below with reference to FIGS. 8 and 9.

Each of the transmitters 118 may include a counter, which may be implemented by the processor 208, for counting the cycles of alternating current flowing in the electric power grid 100. The cycles may be identified by cycle numbers that are defined with reference to a defined event or point in time. For example, the cycle number may correspond with the number of cycles of alternating current that have elapsed since the defined event or point in time. Data transmission by the transmitter 118 may be performed at predetermined cycle numbers that are known to the transmitters 118 and the receivers 120, in order that the transmitters 118 may transmit data at cycle numbers at which the receivers 120, which operate according to the same time base, expect to receive data; that is, the transmitters 118 and receivers 120 are synchronized.

The modulator 210 is arranged to modulate power flow between a power device 119 and the electric power grid 100 in response to the control signals generated by the processor 208. The modulator 210 may comprise a switch for connecting/disconnecting the power device 119 to/from the electric power grid 100 and/or any electrical or electronic means allowing power flow to/from the power device 119 to be modulated. For example, the power device 119 may not necessarily be completely turned off during modulation but may instead be modulated between set points of power consumption and/or provision. The modulator 210 may be an attenuator or some other means for altering the power consumption/provision by the power device 119 (for example, inverter-based chargers for electric vehicles and/or other electric devices, grid-tie inverters for photovoltaic generators, Combined Heat and Power (CHP) generators, or wind generators.

In modulating the power flowing between a power device 119 and the electric power grid 100 according to the pattern of control signals stored in the data store 204, the modulator 210 is able to encode a modulation pattern and superimpose that modulation pattern on the grid frequency for transmission across the electric power grid 100. The grid frequency thereby acts as a carrier signal for information encoded therein and defined by the modulation pattern.

The modulator 210 is typically arranged to modulate power flow to/from the power device 119 at a frequency typically up to 10 Hz (though again this depends on the nature of each electric power grid). In some embodiments, power flow to and/or from a power device 119 is modulated at a frequency less than half of the predefined grid frequency. In some embodiments, power flow is modulated at a frequency less than a quarter of the predefined grid frequency. In some embodiments, power flow is modulated at a frequency less than a tenth of the predefined grid frequency. For example, a modulator 210 may be arranged to modulate power flow at a rate of approximately 1 Hz.

At this frequency range, switching of moderately high loads is possible. Because the modulator 210 modulates power flow to/from the power device 119 at a frequency less than the grid frequency, the modulated signal is not inhibited by the infrastructure of the electric power grid 100 any more than an un-modulated AC electrical power would be. This removes the need to provide an additional route around devices such as transformers 108, 110.

Although the transmitter 118 is shown in FIG. 2 as being separate to the power device 119, it will be understood that in some embodiments the transmitter 118 may be integral to power device 119.

It should be noted that, although the codes are described above as being stored in the data store 204 of the transmitter 118, in some embodiments they may be stored remotely (for example at the controller 122) and accessed by the transmitter 118 when required. For example, the codes may be transmitted to the transmitter 118, in which case they may not be stored at the transmitter 118, or stored only in a temporary data store.

As explained below with reference to FIGS. 4a and 4b, a modulated power flow causes a corresponding modulation of the grid frequency, which is the same throughout a given synchronous electric power grid 100. Typically, this modulation of the grid frequency is very small with respect to the variation that typically occurs in the electric power grid 100 during its operation (that is, the magnitude of the modulation is smaller than the magnitude of the grid noise), the scale of which is described above; for example, the modulation of the grid frequency may be in the range of µHz up to several mHz. In some embodiments, the modulation of the grid frequency may be less than 10 mHz; less than 1 mHz; less than 500 µHz; or less than 100 µHz.

Since the grid frequency is the same throughout the electric power grid 100, the modulated frequency is also the same throughout the electric power grid 100 and so a receiving device (hereinafter referred to as a receiver 120) able to detect the modulated grid frequency is able to receive the data signal at any point at which it can be connected to the grid 100.

Figure 3:
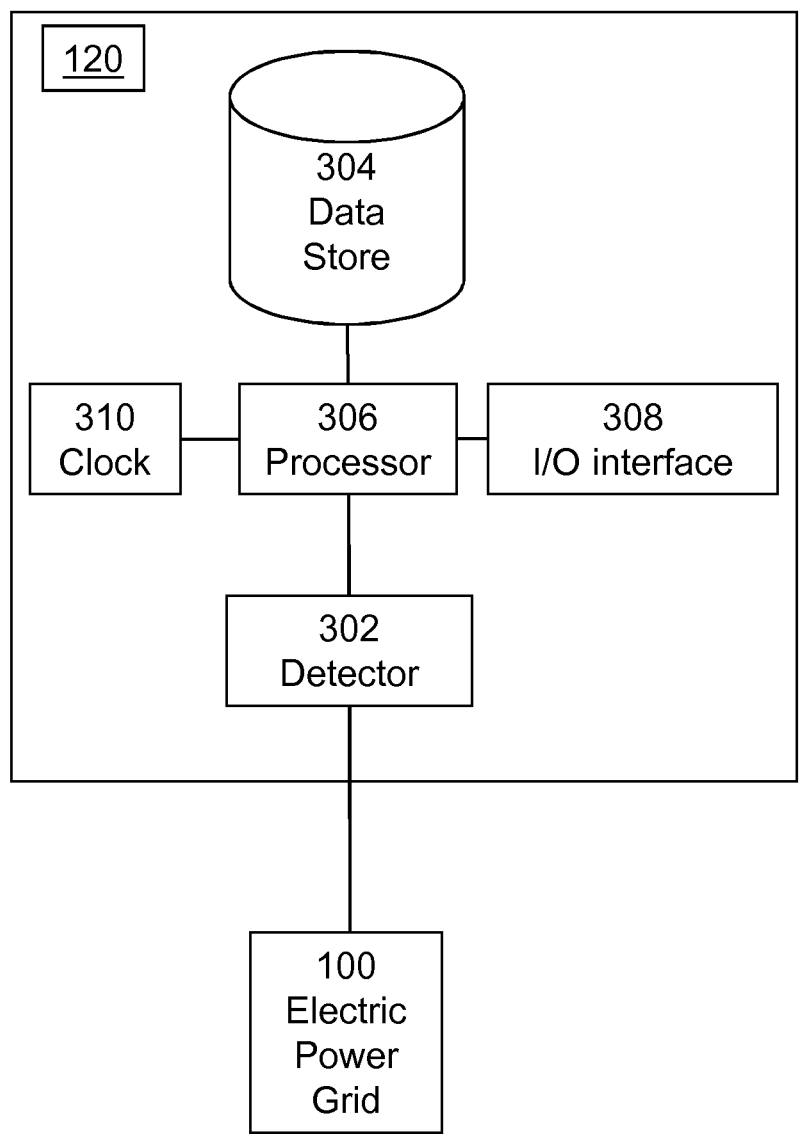
FIG. 3 is a schematic diagram illustrating a receiver in accordance with an embodiment of the present invention.

FIG. 3 is a diagram illustrating an exemplary receiver 120 configured to decode information encoded in a carrier signal and transmitted within an electric power grid 100. The receiver 120 comprises a detector 302, a data store 304, a processor 306, an input-output (I/O) interface 308, and a clock 310.

The detector 302 may be any device capable of detecting or measuring a characteristic relating to the grid frequency with sufficient precision.

In some embodiments, a time period relating to the grid frequency is used as a characteristic measure of the grid frequency. For example, a measurement of the half-cycle, which is the period between times at which the voltage crosses 0V, may be used as a characteristic relating to the grid frequency.

In some embodiments, the actual instantaneous grid frequency, corresponding to the inverse of the time it takes to complete a half-cycle (or a full-cycle) may be determined. The frequency data may be equalized and digitally filtered to remove frequency components outside a known and desired range of signal frequencies. For example, frequency components corresponding to the grid frequency and/or frequency components relating to noise may be removed.

The detector 302 may comprise a voltage detector arranged to sample the voltage at a frequency higher than the grid frequency and an analogue to digital converter arranged to convert the sampled voltage to a digital voltage signal. For example, the voltage detector may be arranged to sample the voltage 1000 times per cycle. The digital voltage signal may then be processed to determine with a high degree of precision (within the range µs to ms) the times at which the voltage crosses 0V.

The detector 302 may comprise a current detector arranged to sample the current at a frequency higher than the grid frequency, and an analogue to digital converter arranged to convert the sampled current to a digital current signal, which may then be processed to determine with a high degree of precision (within the range µs to ms) the times at which the current crosses 0V.

The detector 302 may comprise both a voltage detector and a current detector. Measuring the times at which both the voltage and current crosses 0V enables the receiver 120 to determine a change in the relative phase of the voltage and current, thereby enabling the receiver 120 to compensate for changes in reactive power in the grid. This in turn enables a more accurate measurement of frequency (or a characteristic relating to frequency).

An exemplary method of determining the frequency comprises sampling the alternating voltage at a high rate (for example at a rate of 40 kHz). A trigger level is chosen at which level the sinusoidal voltage waveform is approximately linear. This is typically greater than 0V and may be, for example, between 5V and 50V. The time between two consecutive sinusoidal cycles is determined on the basis of the difference between consecutive times at which the alternating voltage reaches the trigger level. This is repeated multiple times (several thousand times, for example) and an average time is then determined. The average time value is then inverted to determine the frequency.

The data store 304 may store data indicative of one or more predetermined code patterns that relate to modulation patterns that the receiver is likely to receive. The processor 306 may use the stored data pattern format to aid extraction, or decoding, of the information from the measured frequency characteristic.

For example, the processor may be arranged to perform a correlation process to determine a correlation between a portion of the modulation pattern (superimposed on the grid frequency) and one of the stored predetermined code patterns. Alternatively, the receiver 120 may include a dedicated correlator arranged to perform the correlation process. The correlation process may, for example, comprise determining a probability that the measured frequency characteristic contains a modulation pattern corresponding to a stored predetermined code pattern. The information encoded in the measured frequency signal may then be decoded on the basis of the determined correlation. This enables the information to be decoded even when the magnitude of the modulation (which, as described above, could be in the range of µHz up to several mHz) is less than the level of noise in the measured grid frequency (which is typically in the range of 10 to 200 mHz, though these typical values vary significantly from one synchronous grid to another and in a given synchronous grid over time). Furthermore, modulating frequency by such a small degree with respect to the noise in the grid (i.e. the normal variation of grid frequency), and the limits agreed by grid operators, provides the possibility of using a large number of distinguishable states to which the frequency can be modulated without triggering a frequency stabilizing response and/or disrupting the normal operation of the grid.

Although the predetermined code patterns are described above as being stored in the data store 304 of the receiver 120, in some embodiments they may be stored remotely (for example at the controller 122) and accessed by the receiver 120 when required. For example, the predetermined code patterns may be transmitted to the receiver 120, in which case they may not be stored at the receiver 120, or stored only in a temporary data store.

The data store 304 may be used to store decoded information that has been transmitted within the electric power grid 100. Furthermore, the data store 304 may store an identifier that identifies the receiver 120 or may be used to address the receiver 120. The identifier may also be included in the modulation pattern by the transmitters 118. The processor 306, may determine from information in a received transmission whether the transmission relates to the receiver 120 by comparing the identifier stored in the data store 304 with identification information included in the modulation pattern. If the processor 306 determines that the received data is for the receiver 120, the processor 306 may then continue to process and store the decoded information.

The data store 304 may store one or more other identifiers that identify groups to which a receiver 120 is assigned. Transmissions intended for receipt by particular groups may include the identifiers associated with those groups to enable the receivers 120 in the groups to determine whether they are intended to receive the transmission. This may be achieved by determining a correspondence between a transmitted identifier and the one or more identifiers stored in the data store 304 of the receiver 120.

In some embodiments, groups may be defined for different geographical areas. Each group corresponding to a geographical area may be divided into sub-groups relating to smaller areas within a given geographical area. For example, a group may be defined for all the receivers in a particular country, and sub-groups may be defined for each region in that country. Receivers 120 in a particular region of the country may store identifiers relating to the group and sub-group corresponding to their particular location (that is, their country and region) so that data may be addressed to all receivers 120 in a particular country or region.

The receivers 120 may be assigned to groups and sub-groups on the basis of other properties or criteria; for example, the receivers 120 may be assigned to groups and sub-groups on the basis of the characteristics of the power devices 119 to which they are associated. These characteristics for example, could be based on, but not limited to, whether the power device 119 is a power consuming or power producing device, the energy supplier which supplies energy to that power device 119, the electricity network operator whose distribution network 104 the power device 104 is connected to and the original manufacturer of the power device 119.

The groups may be divided into multiple levels of sub-group, such that each sub-group is divided into further sub-groups. The receivers 120 may be assigned to one or more sub-groups in each level of sub-division.

Each of the identifiers associated with the groups and sub-groups to which a receiver 120 is assigned may be dynamically changed to reflect changes to the suitability of the receiver 120 for membership to the groups and sub-groups; such changes may be determined by the controller 122 described below, for example. Updates to the identifiers may be transmitted to the receiver 120 by the transmitter 118.

The data store 304 may store data indicating one or more predefined actions that the receiver 120 is to perform. For example, the one or more predefined actions may include one or more of: altering a setting of the receiver 120; altering a setting of a power device associated with the receiving device (for example, switching the associated power device on or off or reducing or increasing its power consumption or generation); executing a program on the receiving device; stopping a program on the receiving device; and storing data in a register of the receiving device.

The receiver 120 may be prompted to initiate a modulation of power flow to and/or from the power device 119 in order to generate a modulated signal in the electric power grid 100, which may be detected and/or measured by the controller 122, or an entity at some other location in the electric power grid 100. The signal may be detected (or measured) as a power flow, or as a frequency modulation as described herein.

The signal initiated by the receiver 120 may be modulated according to known codes assigned to the receiver 120 and stored in the data store 304. The codes may also be stored at the entity in the electric power grid 100 arranged to receive the signal; this entity may correlate the modulated signal with its stored codes to identify the receiver 120 or an associated power device 119.

The processor 306 may be any processor capable of processing received data. The processor may include, but not be limited to, one or more of an application specific integrated circuit (ASIC), a field programmable gate array (FPGA), a digital signal processor (DSP), and a general-purpose programmable processor.

The processor 306 may be arranged to perform error detection and error correction functions on data that is received over the electric power grid 100. The processor 306 may be arranged to decrypt received data where that data has been encrypted.

Once data has been received and processed by the receiver 120 it may be output to an intended recipient of the data via the I/O interface 308. The I/O interface 308 may be arranged to display information on, for example, a display of a computer or of the receiver 120 itself.

The receiver 120 may also include, or be connectable to, a communications interface, such as a network interface as described above with reference to the transmitter 118, which it uses to communicate with another device via a communications medium different to the electric power grid 100, such as a fixed or wireless communications network. The communications network may include one or more of Global System for Mobile Communications (GSM), Universal Mobile Telecommunications System (UMTS), Long Term Evolution (LTE), fixed wireless access (such as IEEE 802.16 WiMAX), and wireless networking (such as IEEE 802.11 Wi-Fi and IEEE 802.15 ZigBee).

The receiver 120 may use the communications interface to send and/or receive data to/from a remote device. For example, the receiver 120 may send and/or receive data to/from a remote server via the Internet. The communications may be based on the Internet Protocol. The receiver 120 may pull data from a remote server or may receive data pushed from a remote server.

The receiver 120 may use the data received via the electric power grid 100 to initiate communications with the remote device. In this way, communications over the electric power grid may provide a side channel for a further communications network via a communications medium, such as one or more of the communications networks described above. In this case, the carrier signal may be encoded with authentication data that the receiver 120 transmits to the remote device via the further communications network to authenticate itself to the remote device and to initiate communications. The receiver 120 may be, for example, a smart device, such as a smart television or a television set-top box, that is powered by the electric power grid 100 and is connected to the Internet via a telephone or digital subscriber line. The smart device may be arranged to transmit the authentication data, that it receives via the electric power grid 100, to the remote server to authenticate it to the remote server. The remote server may be arranged to transmit the data to the receiver 120 only once the receiver 120 has been authenticated.

Alternatively or additionally, the modulated signal may comprise configuration data that the receiver 120 uses to receive data pushed from the remote device. For example, the configuration data may include a key for decrypting data received via the further communications medium, or may be data specifying a time window during which communications from the remote device via the other communication network are authorized. The receiver 120 may be, for example, a smart device that is arranged to receive command signals and/or pushed software updates, from a remote server, and may do this only once the configuration data has been received via the electric power grid 100.

Using communications over the electric power grid 100 as a side channel for a further communication system enables the receiver 120 to authenticate sources of data received via those systems. In this way, the receiver 120 only receives data via the further communication system from secure or trusted sources without the additional processing burden of using authentication protocols itself.

Received data may be stored or buffered in the data store 304 to be used later. For example, the data may be acted upon only at a predetermined time indicated by a time indicator that is transmitted either with the data or in a separate transmission.

The receiver 120 keeps its timing by counting the cycles of alternating current flowing in the electric power grid 100; for example, the receiver 120 may include a counter, which may be implemented by the processor 306. Where the receiver 120 is temporarily unable to count the cycles of alternating current (for example, during brief power outages), the clock 310 is able to maintain the timing of the receiver 120 to enable the processor 306 to remain synchronized for at least a few cycles. This enables the receiver 120 to continue to receive and process data during periods when it is temporarily unable to count the cycles of alternating current.

The detector 302 may be arranged to detect the grid frequency indirectly by detecting so-called grid noise from electrical appliances connected to the electric power grid 100. For example, the receiver 120 may be a wireless communication device suitably programmed to detect electromagnetic or audio signals (corresponding to frequency variation) emitted by electrical appliances connected to the electric power grid 100, and process those signals to determine the grid frequency as described above. In certain embodiments, the receiver may be a Personal Digital Assistant (PDA), a Smartphone, or a portable computer running a computer program (such as an application) programmed to receive and process data transmitted by the transmitters 118.

The grid frequency varies with the ratio of the total generated power provided to the electric power grid 100 to the total amount of power consumed from the electric power grid 100, referred to herein as a grid power balance. Changes in the grid frequency are due to factors including the operating frequency of turbines in the power generators 106 and the state of tuneable transformers in the electric power grid 100 among others.

Figure 4A:
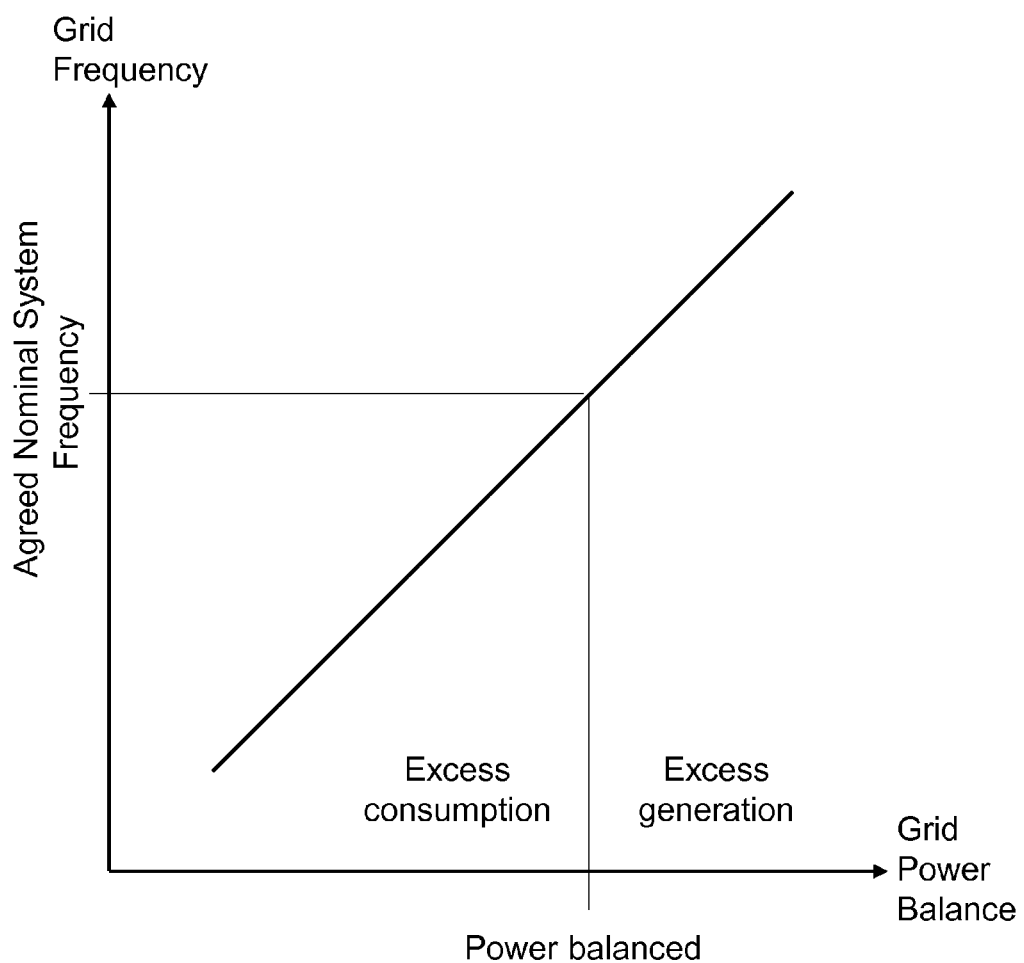
FIG. 4a is a graph showing the relationship between power generation/consumption balance and grid frequency in an electric power grid.

FIG. 4a is a graph showing the relationship between the grid power balance and grid frequency in a typical electric power grid. FIG. 4a shows that there is a monotonic relationship between the grid power balance and the grid frequency over the power balance range in which the electric power grid typically operates. If the total power demand is greater than the total power generation, then the grid frequency falls below an agreed nominal system frequency while if total power generation exceeds the total power demand, the grid frequency rises above the nominal system frequency. For example, in the UK, a change in the grid balance of about 8 GW typically gives rise to a change in the grid frequency of about 1 Hz; in Europe, a change in the grid balance of about 30 GW typically gives rise to a change in the grid frequency of about 1 Hz.

Typically, the greater the overall power flow in the electric power grid 100, the larger the amount of power required to provide a given change in grid frequency. Therefore, larger electric power grids are typically more stable, and require modulation of power devices 119 having a larger overall load to provide the same degree of frequency modulation than smaller electric power grids.

Typically, grid operators are obliged to control the grid frequency to within agreed limits. For example, in the UK, the grid operator typically controls the grid frequency to within 0.4% of the nominal system frequency and, in Europe, grid operators typically control the grid frequency to within 0.2% of the nominal system frequency, although other limits may be used. In order to maintain the grid frequency within the agreed limits, grid operators must ensure that there is sufficient controllable generation and/or controllable demand held in reserve in readiness to be used to counteract changes in the balance of the electric power grid 100 that might result in frequency variations.

In embodiments of the present invention, a relationship between the grid power balance and grid frequency in an electric power grid may be used to transmit information. In particular, as shown in FIG. 4b, the inventor of the present invention has appreciated that modulating the grid power balance induces a modulation in the grid frequency that in a synchronous electric power grid is the same throughout the entire electric power grid.

Figure 4B:
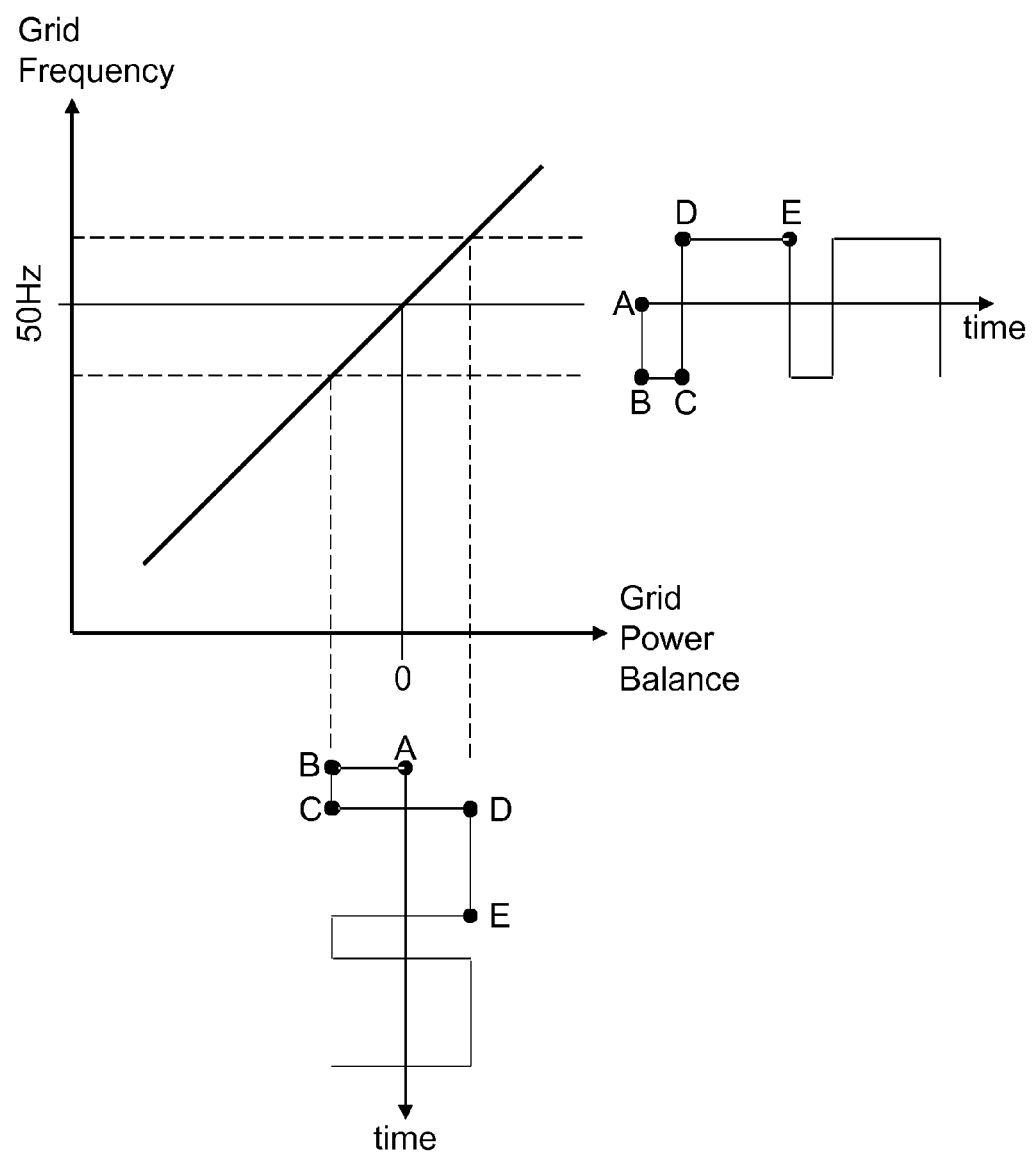
FIG. 4b is a graph showing the relationship between modulated power generation/consumption balance and the resulting grid frequency modulation in an electric power grid.

For example, considering FIG. 4b, at point A the electric power grid 100 is balanced (that is, the total demand for electric power is approximately equal to the total amount of power being generated in or provided to the electric power grid 100) and the grid frequency is stable at, for example, 50 Hz. At point B, the grid power balance is shifted such that there is excess consumption from point B to point C. This results in a corresponding fall in the grid frequency at point B, which is maintained until point C. At point C, the grid power balance is shifted such that there is excess generation at point D, which is maintained until point E. This results in a corresponding rise in the grid frequency between points C and D, which is maintained from point D to point E.

Typically, the maintenance of the increased grid frequency between, for example, points D and E depends on the frequency at which power flow is modulated. In particular, the increased grid frequency may be maintained where the modulation period (the inverse of the modulation frequency) is less than a reaction time for automatic correction and/or for the grid operator to react to changes in grid power balance. In embodiments where the power flow is modulated relatively quickly, power balance compensation mechanisms employed automatically and/or by the grid operator cannot react quickly enough to counteract the modulation, whereas where the power flow is modulated relatively slowly, the power balance compensation mechanisms may begin to degrade the effect of the modulation by counteracting the shifted grid power balance.

As explained above, typically, the magnitude of the grid frequency modulation is in the range of μHz up to several mHz, lower than the amount of variation of the grid frequency (i.e. within the noise level of the measured grid frequency), and so does not exceed the agreed limits within which grid operators must maintain the grid frequency (the nominal system frequency) and does not cause the grid operator to initiate any manual or automatic grid balancing measures in response to the transmission.

Figure 5:
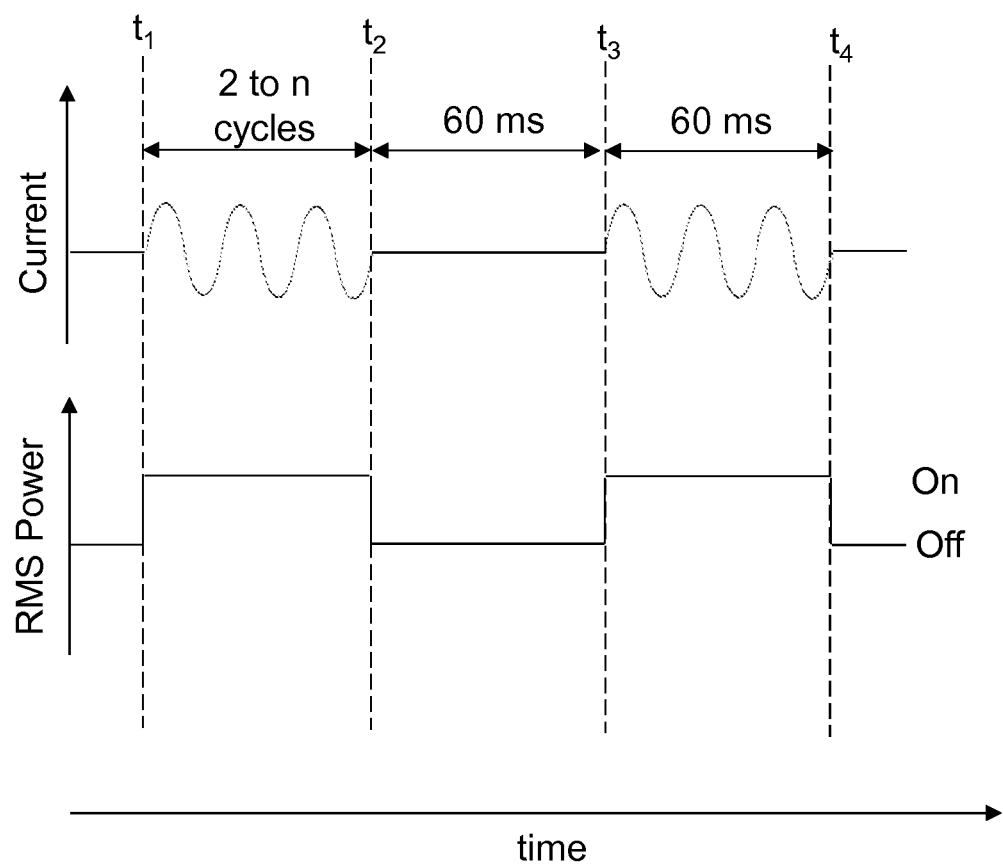
FIG. 5 is a graph showing how power flow to/from a power device can be modulated.

FIG. 5 is a diagram illustrating how power flow to and/or from a power device 119 may be modulated. FIG. 5 shows the current flowing to/from a power device 119 as a function of time and the RMS power flowing to/from the power device 119 as a function of time.

In the example shown in FIG. 5, at time t1, current is allowed to flow to/from a power device 119 until time t2. From t2, current is prevented from flowing to/from the power device 119 until time t3, at which time current to/from the power device 119 is resumed until time t4. The effect on RMS power flowing to/from the power device 119 is also shown in FIG. 5. From t1 to t2 and from t3 to t4 the RMS power flowing to/from the power device 119 is at a high state (represented by "on") and from t2 to t3, the RMS power flowing to/from the power device 119 is at a low state (represented by "off"). Referring back to FIG. 4b, the high and low RMS power flow states have a corresponding high and low state in the frequency characteristic of the electric power grid 100.

As shown in FIG. 5, typically the time that the RMS power is in the on state is typically 2 or more cycles of the AC current flow and typically for an integer number of half-cycles.

In certain embodiments, for simplicity, the time that the RMS power is in the off state is the same as the time that it is in the on state. In the example shown in FIG. 3, where current is allowed to flow for the 3 cycles, the RMS power is in the on state for 60 ms and in the off state for 60 ms when the grid frequency is 50 Hz. However, the time that the RMS power is in the off state may be different to the time that it is in the on state. The transmitted codes may include on and off states having multiple different modulation lengths; that is, the length of time (or number of cycles) that the RMS power is in the on and/or off state varies within the code. For example, the code may comprise on and/or off states with lengths of 3, 5, and 8 cycles.

By controlling the length of time that the RMS power is in the on and off states, the frequency at which the modulation occurs can be tuned to avoid frequencies at which there are large amounts of narrowband noise in the electric power grid 100 and/or can provide frequency diversity, such that signals are transmitted over several frequency channels, or a frequency band that is wider than the narrowband noise. This provides a more robust method of transmitting signals in the presence of narrowband noise.

Referring back to FIG. 1, in some embodiments, the transmitters 118 act in response to instructions received from a controller 122 that is arranged to transmit data to the transmitters 118. The controller 122 may be able to connect to the transmitters 118 via a wired or wireless connection, such as via a wireless access node 124. As shown in FIG. 1, the controller 122 may transmit data to the transmitters 118 via a data communications network such as the Internet 126. As explained above, the controller 122 may not have any direct electrical power connection to the electric power grid 100.

Figure 6:
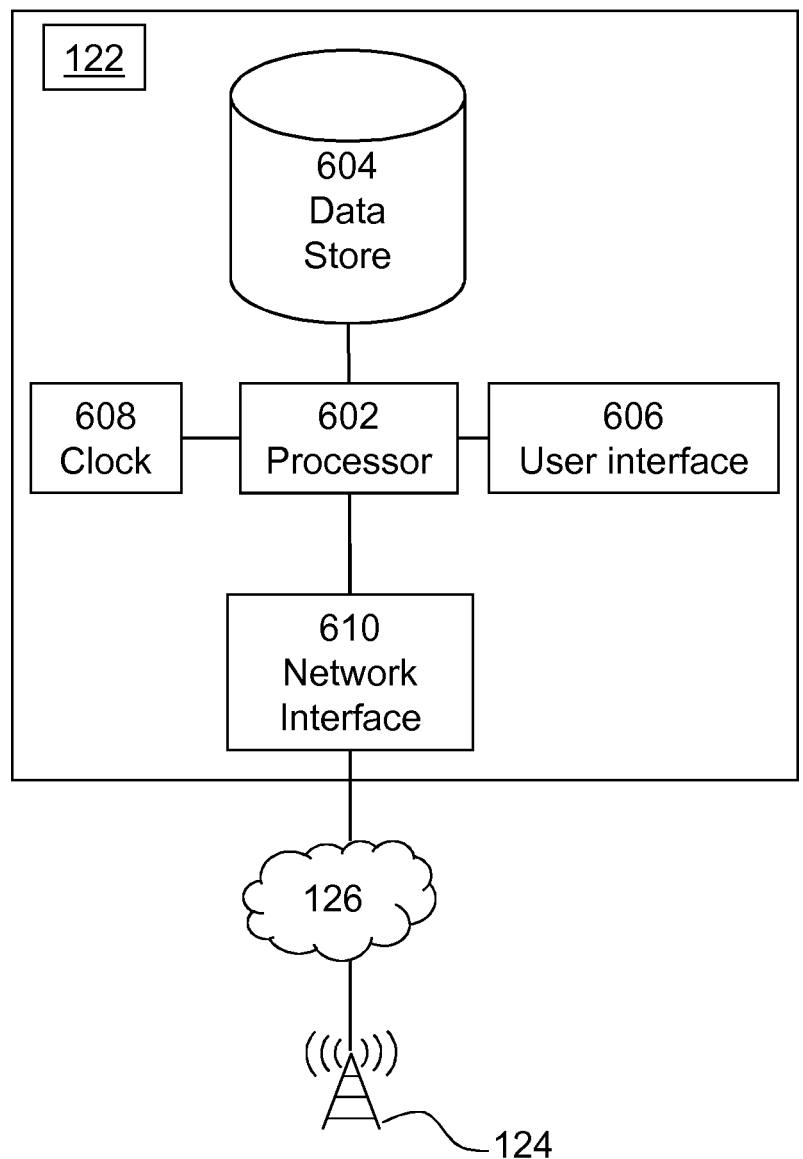
FIG. 6 is a schematic diagram illustrating a controller.

FIG. 6 is a diagram illustrating an exemplary controller 122 for controlling transmissions of data in the electric power grid 100. The controller 122 manages broadcasts that are to be transmitted by the transmitters 118. The controller 122 may include one or more servers located in a control center. The controller 122 may be arranged to receive requests from users wishing to transmit data across the electric power grid 100 and, in response to receiving such requests may configure data packets to be transmitted.

The controller 122 comprises a processor 602, a data store 604, a user interface 606, a clock 608, and a network interface 610.

The data store 604 may be used to store data that is to be transmitted within the electric power grid 100.

The data store 604 may also include a database containing records of deployed receivers 120. The records may include information including identifiers of the receivers 120 (that may be used to address particular receivers 120), device capabilities, information about the configurations of the receivers 120 (such as a current software version operating on the receiver 120 or a current broadcast schedule stored at the receiver 120), information about the location of receivers 120 and information about other devices connected to the receivers 120 (such as the power devices 119) and the capabilities of these connected other devices.

The data store 604 may include information about the grouping of receivers 120, and may store identifiers that may be used by the controller 122 to manage groups of receivers 120, and to send data to an addressed group of receivers 120; for example, control data may be sent to an addressed group of receivers to cause them to each act in the same way.

Users (for example, owners) of a receiver 120 may be able to register their receiver 120 in the data store 604 via the user interface 606. Users may also upload messages that are to be transmitted via the user interface 606. For example, the user interface 606 may be a client interface accessible by the users via the internet 126. Information relating to messages that are to be transmitted, such as the date and time when the message is to be transmitted, and the recipients of the message may also be entered and stored in the data store 604 via the user interface 606.

Each registered receiver 120 may be assigned to one more groups of receivers 120. Each group that a given receiver 120 is assigned to may have a corresponding identifier that is stored in a record associated with the given receiver 120. As described above with reference to FIG. 3, the one or more identifiers may also be stored in the data store 304 of the respective receiver 120, and may be used to determine whether received data is intended for receipt at that receiver 120.

The processor 602 is arranged to retrieve data from the data store 604 and form messages that are then transmitted to the transmitters 118. The controller 122 may be able to connect to the transmitters 118 via a wired or wireless connection. For example, the controller may connect via the network interface 610 to a wireless access node 124 using one or more of a number of radio access technologies including Global System for Mobile Communications (GSM), Universal Mobile Telecommunications System (UMTS), Long Term Evolution (LTE), fixed wireless access (such as IEEE 802.16 WiMAX), and wireless networking (such as IEEE 802.11 Wi-Fi and IEEE 802.15 ZigBee). As described above, the controller 122 may transmit data to the transmitters 118 via a data communications network such as the Internet 126.

Data may be communicated to the transmitters 118 using any appropriate data transmission protocol such as, for example, but not limited to, Transmission Control Protocol (TCP), User Datagram Protocol (UDP) or 6LoWPAN protocol.

At the required time (or in advance of the required time) the controller 122 may transmit messages including the data that is to be transmitted to one or more transmitters 118 in the electric power grid 100. The one or more transmitters 118 may then each receive the data that is to be transmitted and, at the appropriate time begin transmitting the data within the electric power grid 100.

The transmitters 118 may connect to and poll the controller 122 to check if the controller 122 has any new data that needs to be transmitted. This provides additional security to the transmission because data is only received by the transmitter 118 when it actively looks for data from trusted sources.

By transmitting data from the controller 122 to the transmitters 118 and then transmitting the data within the electric power grid 100, data can be transmitted over a wide area to many receivers 120 while only needing to establish a conventional data channel with a relatively small number of transmitters 118.

In order that each of the transmitters 118 is synchronized with each of the other transmitters 118, the controller 122 may also transmit synchronization signals to the transmitters 118. However, the transmitters 118 may be synchronized according to some other signal; for example, the transmitters 118 may be synchronized using one or more of a GPS signal, an internet network time, or a low-frequency radio clock signal based on a time from an atomic clock such as, for example, the "MSF" radio time signal from the National Physical Laboratory in the UK. The transmitters 118 therefore are able to share a common time base, which is used when transmitting signals to the receivers 120.

In some embodiments, transmission of data is performed according to a broadcast schedule. Different types of data may be broadcast at different, pre-agreed, times according to the broadcast schedule. The transmitter 118 and/or the receiver 120 may be pre-programmed or hard-wired with the broadcast schedule so that it may receive particular types of data at the relevant times once synchronized. The broadcast schedule may be provided to the transmitter 118 and/or the receiver 120. The transmitter 118 might provide the broadcast schedule to the receiver 120.

Figure 7:
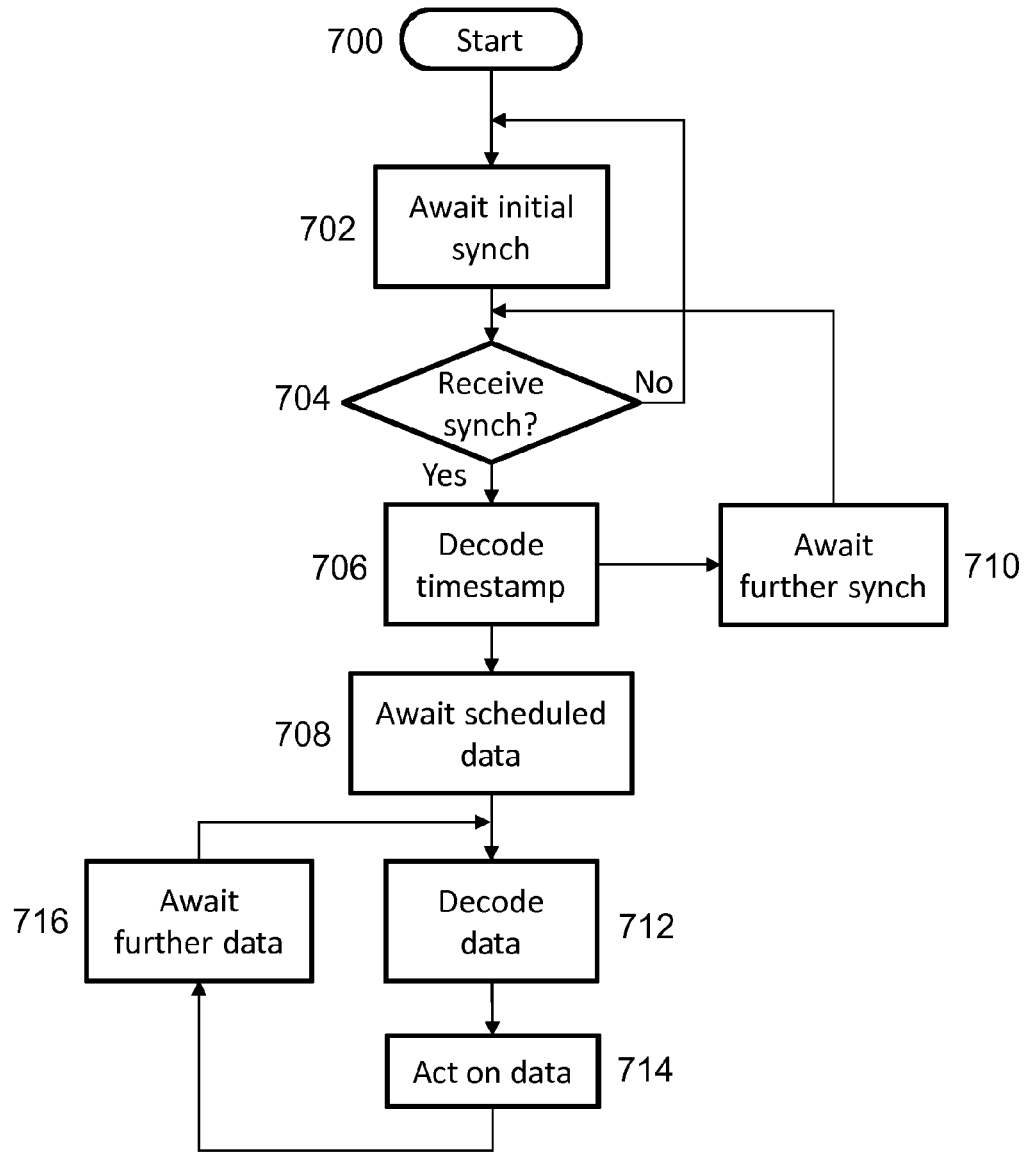
FIG. 7 is a flow diagram showing an exemplary method of synchronizing a receiver and receiving data.

FIG. 7 is a flow diagram showing an example of the behavior of a receiver 120 after first beginning to measure a characteristic relating to the grid frequency.

At step 700, the receiver 120 begins measuring a characteristic relating to the grid frequency. Step 700 may be initiated when the receiver 120 is first connected to the electric power grid 100, for example. The receiver 120 may then begin counting the cycles of alternating current flowing in the electric power grid 100.

At step 702, the receiver 120 waits to detect an initial synchronization pilot signal that will enable the receiver 120 to identify a fixed point in time to give relative synchronization with the common time base used by the transmitters 119. Providing a synchronization pilot signal enables the receiver 120 to synchronize its operation whilst using a relatively low amount of processing resources. This enables more of the processing capability of the receiver 120 to be dedicated to receiving data, which enables the receiver 120 to receive data at a higher bit rate. The one or more transmitters 118 may periodically broadcast the synchronization pilot signal for receipt at each receiver 120 that is measuring a characteristic relating to the grid frequency. The synchronization pilot signal may be based, for example, on a phase shift key or may be any other type of signal with a characteristic that enables synchronization.

Transmission of the synchronization pilot signal and of the data may be arranged to occur at a predetermined interval. The predetermined interval may be pre-agreed (that is, it may be standard for all transmitters 118 and receivers 120). For example, the synchronization pilot signal may be broadcast once every 20,000 cycles. For example, the predetermined interval may be altered by reprogramming the transmitters 118; such reprogramming may be performed by transmitting data from the controller 122 to the transmitters 118. An exemplary synchronization pilot signal is described below with reference to FIG. 8.

At step 704, the receiver 120 determines whether it has received a synchronization pilot signal. Where the receiver 120 has not received a synchronization pilot signal the receiver 120 returns to step 702 and continues to wait for a synchronization pilot signal. Where the receiver 120 has received a synchronization pilot signal and has a fixed time reference point, it moves to step 706.

At step 706, the receiver 120 decodes a timestamp, which identifies the time reference point determined at step 704. For example, the reference point determined at step 704 may be identified by a cycle number. The cycle number may be, for example, the number of cycles of alternating current that have elapsed since a fixed point in time, such as the start of a particular day. For example, the timestamp may identify the reference point identified at step 704 as cycle number 10,000 if there have been 10,000 cycles since the fixed point in time.

The timestamp may be received at a predetermined number of cycles after the reference point determined from the synchronization pilot signal at step 704. For example, the timestamp may be transmitted 300 cycles after the reference point (that is, at cycle number 10,300).

At step 708, the synchronized receiver 120 continues to count the cycles of alternating current in the electric power grid 100 and waits for a predetermined number of cycles from the reference point determined at step 704 for the arrival of scheduled data. The cycle number at which data is scheduled to be transmitted may be pre-programmed or hard-wired in the receiver 120 so that the receiver 120 can be ready to begin receiving data at that cycle number.

At step 710, which may occur in parallel to steps 708, 712, 714 and 716 described below, the synchronized receiver 120 also waits for a predetermined number of cycles from the reference point determined at step 704 for the arrival of the next synchronization pilot signal. The cycle number at which the synchronization pilot signal is next scheduled to be transmitted may be pre-programmed or hard-wired in the receiver 120 so that the receiver 120 can be ready to begin receiving the synchronization pilot signal at that cycle number.

At step 712, at the scheduled cycle number, the receiver 120 begins receiving and decoding data via physical and/or logical channels. The data may be received in frames. The first few bytes of data in the frame may contain an indication of one or more of the type of data that is to be received, the length of the frames that are to be received, and/or the frame structure. An exemplary data frame is described below with reference to FIG. 9.

Step 712 may include determining from an identifier in the received data whether the data is intended for receipt by the respective receiver 120. The identifier may be compared to one or more identifiers stored in the receiver 120 to determine whether the data is intended for the receiver 120 and, if the identifier corresponds to one or more identifiers stored in the receiver 120, the receiver 120 may process the data accordingly.

A new identifier may be received to replace a stored identifier. This enables an operator of the controller 122 to assign a new identifier to a given receiver 120 in order to manage membership of groups of receivers 120 and to broadcast data to particular groups of receivers 120 so that members of a given group of receivers 120 act in the same way.

At step 714, the receiver 120 takes an action based on received data. The actions that may be performed on the basis of the received data may include one or more of updating output registers, initiating changes to a configuration of the receiver 120, resetting the receiver 120 to a previous setting, starting a process, stopping a process, and loading or storing updated information such as payload data received as part of the scheduled data, which may include an updated schedule, an updated identifier, or updated configuration settings, for example.

At step 716, the receiver 120 continues to count the cycles of alternating current in the electric power grid 100 and wait for further scheduled data to be received.

The receiver 120 may determine that no actions are required on the basis of the data that is decoded at step 712, and may proceed to step 716 without performing any particular action.

It will be understood that the steps described above with reference to steps 708, 712, 714, and 716 may be performed in parallel. For example, data that has been previously received may be decoded and/or acted upon at the same time that the receiver 120 waits for and/or receives further data.

Although not shown, the process may end, when for example, the receiver 120 disconnects from the system (for example, the receiver 120 may be physically disconnected from the electric power grid 100).

In some cases, after receipt of a particular transmission, the process may return to step 708 to wait for new scheduled data. In other cases, the process may return to step 702 and the receiver 120 await the next synchronization pilot signal.

Figure 8:
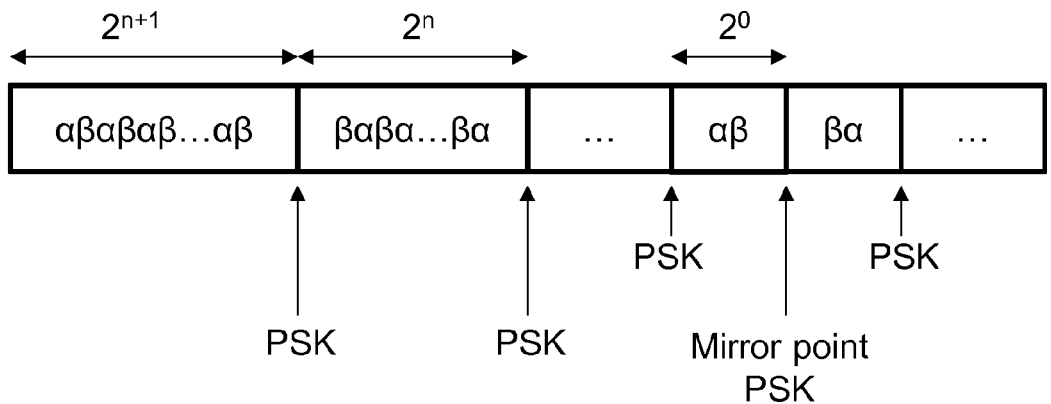
FIG. 8 shows an exemplary synchronization pilot signal.

FIG. 8 shows an exemplary synchronization pilot signal comprising variable length repeating sequences of pairs of high (α) and low (β) base states, separated by phase shift keys (PSK), each pair of high-low states forming a period (αβ or βα). At the PSK, the phase of the signal shifts by 180°, and this phase shift is detectable by the receivers 120. It will be noted that the synchronization pilot signal shown in FIG. 8 is just one example of a pilot signal, and other forms of signal may be used.

Each phase of the synchronization pilot signal has a length defined by the number of periods depending on a separation in time from a mirror point PSK. The mirror point PSK acts as a reference point in time that the receivers 120 look for in order to synchronize their operation to receive data properly. In particular, the length of a given phase of the synchronization pilot signal is defined by the number of states in a base unit (in this case a pair of states) raised to the power of the number of PSKs between the respective phase and the mirror point PSK. In other words, the length of the phase can be formalized as $x^n$, where x is the number of states in the base unit and n is the number of PSKs between the respective phase and the mirror point PSK.

In the example shown in FIG. 8, the first phase adjacent the mirror point PSK has a length of $2^0$ (that is equal to 1 period) because there are two states in the base unit (high, α, and low, β) and there are no PSKs between the first phase and the mirror point PSK. The next phase has a length of two periods ($2^1$) since there are two states in the base unit (1 period) and there is one PSK between the respective period and the mirror point PSK. For the nth period, the length of the period is $2^n$ since there are two states in the base unit (1 period) and there are n PSKs between the nth period and the mirror point PSK.

By detecting the occurrence of PSKs in a received synchronization pilot signal, and by detecting the length of a given phase (that is, the time between one PSK and a subsequent PSK), the receivers 120 can extrapolate the timing of the mirror point PSK and thereby determine a known point in time that is synchronized with the time base used by the transmitters 118. Once the receivers 120 are synchronized, they may receive data transmitted within the electric power grid 100 by the transmitters 118.

In some embodiments, when a receiver 120 first connects to the electric power grid 100, it may begin listening for a synchronization pilot signal, and when a synchronization pilot signal is received, the processor 306 synchronizes the receiver 120 with the mirror point PSK. Once the receiver 120 is synchronized it may then begin listening for transmitted data as described above with reference to FIG. 7, for example.

Figure 9:
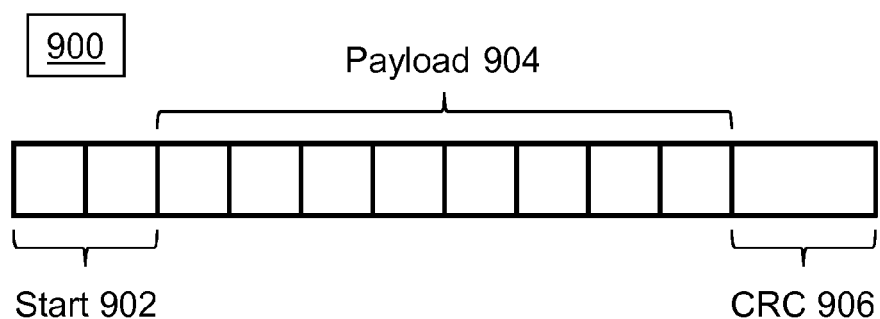
FIG. 9 shows an exemplary data frame.

FIG. 9 shows an exemplary data frame 900 suitable for transmitting data within the electric power grid 100. The frame 900 comprises a start portion 902, a payload portion 904 and a cyclic redundancy check (CRC) portion 906.

The start portion 902 may contain a known pattern of bits that the receiver can use to confirm the synchronization of the receiver 120 and/or confirm that data is about to be received. A receiver 120 may resynchronize using the start portion 902 in the event the synchronization has been lost since the receiver 120 received a synchronization pilot signal. For example, if a device in the electric power grid 100 (such as a reactive power compensation device of a transformer) switches on/off, there may be a gap in the power supply that is longer than the time the clock 310 can maintain the synchronization of the receiver 120. In such cases, the timing of the receiver 120 may drift with respect to the timing of the pilot synchronization signal.

The payload portion 904 comprises a string of bits that represent the data that is to be transmitted within the electric power grid 100. The payload portion 904 may be any length suitable for containing enough payload data. Typically, the payload portion 904 typically has a predetermined length. For example, the payload portion may comprise 8 bytes each comprising 8 bits (or chips). By having a predetermined length, the payload portion 904 may be protected by the CRC portion 906.

The payload data may be any data that is required to be transmitted within the electric power grid 100. For example, the payload data may include control information relating to a power device 119 associated with a given receiver 120. For example, the power device 119 may be a controller for a heating system and the data transmitted to its associated receiver 120 may include control instructions for switching the heating system on or off at defined times or may include instructions for setting a temperature; such data may, for example, be based on a weather forecast for a given geographical area in a future time interval, thereby improving end user experience. In another example, the power characteristics of a plurality of power devices 119 could be adjusted to meet the requirements for ancillary service provision to a transmission grid operator and/or a distribution grid operator for the purposes of stabilizing grid frequency or balancing intermittent renewable generation such as photovoltaic devices and/or wind turbines.

In one example, the payload portion 904 includes software code for updating or replacing code used to control the receiver 120, such as software or firmware that the receiver 120 uses to process received data or, where the receiver 120 is electronically integrated to its host power device 119, the payload portion 904 may also update, re-configure or change existing settings of the host power device 119.

The CRC portion 906 is an error-checking portion. The CRC portion 906 may comprise, for example, checksum bits that the receiver can use to determine whether the payload data has been received correctly. The checksum bits may be used by the processor 306 of the receiver 120 to detect and/or correct corrupted data bits in the payload portion 904. The length of the CRC portion 906 may be selected to balance the efficiency of the frame 900 (in terms of data throughput or bandwidth) and the reliability of the data.

The frames 900 may be combined into a so-called super frame to further increase the reliability of the transmitted data. Each super frame may include a predefined number of frames; for example, each super frame may comprise 32 frames. Information regarding the structure of the super frame may be included in the first frame (or the first few frames) of the super frame. The data in the frames is repeated in the super frame to add redundancy to the transmitted information and allowing forward error correction. For example, between 50% and 100% of the data that is to be transmitted may be duplicated. Increasing the redundancy of the information in the super frame enables the transmission to be more robust and less susceptible to noise or to peaks in the noise spectrum that may be caused by switching in the electric power grid 100, for example.

The high and low states described above with reference to FIG. 8 may be used as the data bits for the transmission of data. Alternatively or additionally, a pair or other combinations of high and low states may be used as one bit, referred to as a chip; for example, the pair "$\alpha\beta$" may define the chip "1" and the pair "$\beta\alpha$" may define the chip "0".

As explained above, the transmitters 118 typically modulate small amounts of power so that the corresponding modulation of the frequency is low (well within the agreed limits within which the grid operator must control the grid frequency). Therefore, it may be desirable to decrease the susceptibility of the broadcast signal to noise. In some embodiments, the effect of noise on transmitted data is reduced by spreading the bit coding.

Figure 10:
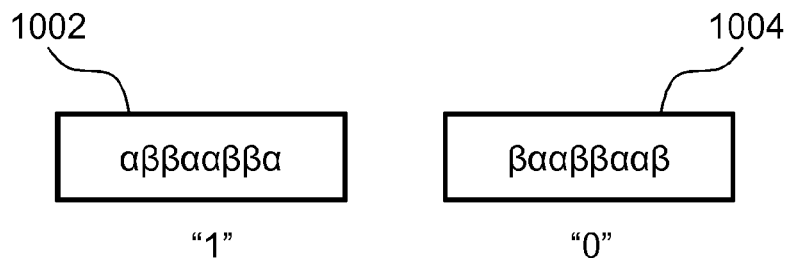
FIG. 10 illustrates exemplary bit spreading for transmission of information.

FIG. 10 shows an exemplary method of bit code spreading. In the example shown in FIG. 10, a single bit is a pulse of repeating code referred to herein as a chip 1002. The chip 1002 is defined by a sequence of high and low states with a defined length. The chip 1002 defines a high state ("1") and is defined by the sequence $\alpha\beta\beta\alpha\alpha\beta\beta\alpha$. The corresponding low ("0") state chip 1004 is defined by an inverted sequence of bits, namely $\beta\alpha\alpha\beta\beta\alpha\alpha\beta$. By spreading the bit coding into chips 1002, 1004 as shown in FIG. 10, the total amount of energy that contributes to the chips 1002, 1004 can be increased without needing to increase the degree of frequency modulation and the corresponding increase in power amplitude modulation. That is, the bit-spread chip 1002, 1004 enables a detection gain. It will be understood that although the chips 1002, 1004 shown in FIG. 10 comprise four pairs of high-low bits, chips with greater length could be used with a corresponding increase in the detection gain and ease of reception.

The high ("1") and low ("0") bit-spread chips 1002, 1004 of FIG. 10 each have the same length, and are made up from high-low pairs each having the same length. The chips 1002, 1004 will therefore have a single associated frequency. However, chips may be made up from more complex combinations of high and low states. For example, the chips may comprise multiple high states, or multiple low states, in a row; this enables spreading of the energy of the chips to different frequencies further increasing resistance of the transmitted data to noise.

In some embodiments, multiple transmission systems may be implemented on the same electric power grid 100 and may be arranged to operate in parallel. In order that activity in respect of one transmission system does not interfere with activity in respect of another transmission system, transmissions systems may be assigned resources having mutually orthogonal, or quasi-orthogonal, properties. It will be understood that multiple transmission systems may operate on the same electric power grid 100, and the capacity of the electric power grid 100 may be increased, by using resources with properties that are not fully orthogonal. The resources can be orthogonal or quasi-orthogonal in frequency, time, code or a combination thereof. This may lead to the use of frequency separation, time division separation, or code division separation of the transmission systems, or a combination thereof. The receivers 120 may be accordingly tuned, synchronized, matched, correlated etc., in order to identify transmission from the transmission system (or systems) to which they belong.

The receiver 120 may apply a statistical or probabilistic weighting to each received bit or chip; for example, each bit could have an associated confidence value indicating the probability that that bit has been correctly received. The probability may be determined based on quality characteristics of the communications channel such as signal strength, noise level etc. For example, a bit or chip with a value 1 that is received on a good quality channel might be represented as 1 (0.9), meaning that the receiver 120 is 90% confident that the received bit or chip has the value 1. Alternatively, the probability value and the bit value may be combined into a single value.

Data transmitted by one transmission system operating on the electric power grid 100 may be distinguished from data transmitted by other transmission systems operating on the same electric power grid 100 using code division multiplexing. That is, a respective code associated with a given transmission system is orthogonal or quasi-orthogonal to codes associated with other transmission systems such that a code associated with a given transmission system is not correlated with codes associated with other transmission systems, or is only very weakly correlated therewith. This enables the various transmission systems operating on the electric power grid 100 to transmit data at the same time.

In an exemplary embodiment, multiple transmission systems operating on the same electric power grid 100 may be separated in code space by allocating each transmission system a coding scheme having a different length base unit. For example, a first transmission system may be allocated the coding scheme described above with reference to FIG. 8, in which there are two states in the base unit, and a second transmission system may be allocated a coding scheme in which there are three states in the base unit.

Transmissions systems may only be allocated coding schemes having base units with a prime number of states. For example, a third transmission system may be allocated a coding scheme in which there are five states in the base unit. Allocating coding schemes with base units having a prime number of states increases the number of bits that can be transmitted without the different coding schemes overlapping, thereby facilitating separation at the central receiver of data from different transmissions. Transmission systems operating on the electric power grid 100 may be scheduled to transmit data at certain times that are different to the times that other transmission systems are scheduled to transmit data. The schedule may be coordinated by the controller 122. A given receiver 120 may be part of multiple transmission systems operating on the electric power grid 100 and may receive transmissions from transmitters 118 in each of those transmission systems.

The above embodiments are to be understood as illustrative examples of the invention. Further embodiments of the invention are envisaged. For example, although the transmitters and receivers are described above as separate entities, transmitters and receivers may be combined in a single transceiver unit capable of transmitting and receiving data.

In some embodiments, data may be transmitted by one transmitter 118 (or transceiver) to one receiver 120 (or transceiver) in a point-to-point manner. The data signal may be observed by all receivers 120 connected to the electric power grid 100 but only acted upon by the one specific receiver 120. Transmissions from the one transmitter 118 to the one receiver 120 may be assigned resources having mutually orthogonal, or quasi-orthogonal properties to other transmissions, as described above with reference to multiple transmission systems.

In order that the modulated signal is detectable, the data may be transmitted using bit code spreading as described above with reference to FIG. 10.

In embodiments that transmit data in a point-to-point manner, data may be transmitted by the transmitter 118 on an ad-hoc basis, rather than at scheduled times, which enables data to be transmitted with a greater degree of flexibility. The receivers 120 may be configured to receive data transmitted by the transmitters 120 asynchronously; for example, the transmitters 118 may include information in the transmitted data to indicate to a receiver 120 that data is being transmitted, as described below.

The transmitter 118 and the receiver 120 may share a common code that is transmitted with the transmitted data. The receiver 120 may detect the common code to identify signals containing data that the receiver 120 is intended to receive. The common code may be selected from a list of publicly available codes; for example, the code may be selected from a directory listing the codes associated with each receiver 120 in the transmission system. This enables multiple ones of transmitters 118 to address data to a given receiver 120.

The transmitter 118 may include an address of a specific receiver 120 in the transmitted data, so that only the specific receiver 120 decodes the data in response to determining that the address corresponds to its address.

The transmitter 118 and receiver 120 may share a secret code that is included in transmissions from the transmitter 118 to the receiver 120. In such embodiments, only the specific receiver 120 for which the broadcast data is intended is able to decode signals containing data that is to be transmitted to the receiver 120 and other receivers 120 that do not have access to the secret code are not able to decode the data; the transmitted data may appear to all other receivers as noise or meaningless data. This enables data to be transmitted across the electric power grid 100 securely. The shared secret code may be a symmetric key that the transmitter 118 and receiver 120 use to encrypt and decrypt transmissions to improve the security of the transmitted data.

In some embodiments, transmissions are encrypted using asymmetric public key encryption. In such systems, each of the transmitters 118 and receivers 120 have a public key and a private key, where the key used to encrypt data is not the same as the key used to decrypt that data. For example, a transmitter 118 may use the public key of a receiver 120 to encrypt data that is to be transmitted to the receiver 120, and the receiver 120 uses its private key to decrypt that data. Using asymmetric keys to encrypt data enables transmissions to be authenticated and their integrity verified, and enables the contents of the transmissions to remain private. In particular, using asymmetric keys prevents hijacking of a receiver 120 and prevents unauthorized use of an intercepted key, for example. The public keys may be verified by a certificate authority as belonging to a particular user or entity and, as such, may have a digital certificate.

The receiver 120 may synchronize its operation based on information contained within the transmitted data. For example, the transmitted data may contain synchronization information that the receiver 120 is able to detect and use to synchronize its operation in preparation to receive data. Payload data capacity, and therefore transmission bit rate, may be sacrificed to compensate for the additional data overhead used for synchronization information.

The data transmitted to the receiver 120 may be formatted with a known frame structure. Each frame may include start bits that the receiver 120 is able to detect at any time, and which may define bit boundaries within the frame. In response to detecting the start bits, the receiver 120 may be able to determine when data is to be received. The number of start bits may be greater than that described above with reference to FIG. 9 in order to compensate for the lack of a priori knowledge of when data is to be transmitted that is provided by a schedule. The frame may also include a payload portion and a CRC portion, as described above with reference to FIG. 9. In some embodiments, more of the frame may be dedicated to the start bits than to the data that is to be transmitted. The frame may also include stop bits, indicating when the transmission of data will end. In some embodiments, the receiver 120 may include a larger memory capacity in order to store the additional data required to receive data in a point-to-point manner.

Where the transmitter 118 and the receiver 120 are each transceivers, a two-way communication channel between the transceivers may be established. For example, a forward channel and a reverse channel may be established.

Point-to point transmissions may be made from a transmitter 118, or group of transmitters 118, to one or more receivers 120 based on identification data including a plurality of identifier types. The identifier types may each relate to a different property or characteristic of the one or more receivers 120; for example, the identifier types may relate to one or more of a geographical location (such as a postal address or postal code) a device operating characteristic, an ownership group, a network address, a network address range, a telephone number, and a telephone area code. The different identifier types may each represent a semantic group to which one or more receivers 120 may belong. Receivers 120 belonging to one or more of the semantic groups represented by the identifier types in the identification data may receive data. The identification data may also include logical expressions by which the plurality of identifier types are linked with logical operators, such as AND, OR, and NOT operators and/or combinations of those operators. Each of the receivers 120 may extract the identification data and test the conditions in the logical expression to determine whether the expression is true for that receiver 120; that is, whether that receiver 120 has all of the properties identified in the identification data and is intended to receive the transmitted data. For example, the receivers 120 may make a determination about their membership of the semantic group identified first in the identification data and, if a given receiver 120 determines that it is a member of that semantic group, that receiver 120 may then make a determination about its membership of the next identified semantic group. The receiver 120 may iterate through each of the semantic groups identified in the identification data. Each receiver 120 that determines that all of the logical expressions are true may receive the data.

Addressing the receivers 120 using semantic groups provides an efficient way to transmit data to a large number of receivers 120, that have the same or similar properties, by enabling those receivers 120 to be addressed without the need to determine the individual identifiers of each of the receivers 120 that are to be addressed, or to transmit each of those individual identifiers with the transmitted signal.

Each of the semantic groups may have multiple levels representing different levels of generality and receivers 120 may be arranged to identify that they belong to a semantic group with a higher level of generality by recognizing that they possess an identifier belonging to that semantic group but having a lower level of generality. For example, identifiers that represent geographic locations may include data representing one or more of a country, a region, a county, a city, a town, a street, postcode, and coordinates or grid reference; a receiver 120 may determine that it should receive transmissions addressed to receivers 120 within a given city by recognizing that, for example, its postcode is a postcode within that city.

In some embodiments, point-to-point transmissions may be made between multiple individual transmitters 118 (or transceivers) and a single receiver 120, hereinafter referred to as a central receiver, and the multiple distributed transmitters 118 may each transmit data to the central receiver. The central receiver may have access to codes (such as addresses or identifiers) associated with each of the transmitters 118 and each transmitter 118 may include information relating to their respective code in transmissions to the central receiver.

Data transmitted from each of the multiple transmitters 118 may be separated (to be orthogonal or quasi-orthogonal in time) based on a time difference. Each of the multiple transmitters 118 may start transmitting data to the central receiver at a random start time. For example, each of the transmitters 118 may be requested to transmit information to the central receiver at a particular time or within a particular time-frame. In order to prevent each of the transmitters 118 transmitting to the central receiver at the same time, the transmission system may be arranged such that distributed transmitters 118 each have sufficiently different transmission start times to each of the other transmitters 118. For example, the transmitters 118 may be arranged to add a random time delay to the time at which they receive a request to transmit data to the central receiver. This increases the likelihood that the data transmitted by each of the transmitters 118 is received at the central receiver at sufficiently separated times (that is, times separated by more than the length of time of the transmission) so that the central receiver can distinguish between transmissions from different transmitters 118.

Each transmitter 118 may determine the random time delay based on information that is unique to that receiver. For example, the random time delay may be determined based on a serial number of the transmitter 118. This reduces the likelihood of two or more transmitters 118 using the same time delay, and therefore facilitates separation at the receiver 120 of data from different transmissions.

The central receiver may be arranged to determine that data transmitted by two or more transmitters 118 is received at the same time or within the timeframe of the data transmission (that is, within the length of time that a given data frame is transmitted). For example, the central receiver may be arranged to identify that a received signal contains two or more patterns of data shifted by a time less than the length of time of the transmission. In response to determining that a received signal contains data transmitted by two or more receivers, the central receiver may determine that the signal should not be processed to extract the data.

The central receiver may then request that data that is not extracted from a received signal be resent from each of the transmitters whose data could not be extracted. For example, data transmitted by each transmitter 118 may include information relating to its address or identifier, and information relating to a status of the transmitter 118 or a device associated with the transmitter 118. After receiving data from each transmitter 118, the central receiver may note the identities of transmitters 118 from which data has been received successfully and may then interrogate individual transmitters 118 from which data has not been received successfully, and request that those transmitters 118 retransmit their data. The central receiver may specify the properties of a resource, such as a time delay or a new code, for the transmitter 118 to use in order to manage the receivers so that the separation at the receiver 120 of data from different transmissions is maintained.

The transmitters 118 may retransmit all or a proportion of transmissions, even in the absence of a request from the central receiver to do so. This reduces the likelihood that transmissions that have not been received successfully by the central receiver are not retransmitted due to the request for retransmission also not being received by the transmitter 118.

The central receiver may transmit an acknowledgement message to the transmitters 118 from which data is received successfully. In the event that, after transmitting data to the central receiver, the transmitter 118 does not receive an acknowledgement, the transmitter 118 may re-transmit the data. For example, the transmitter 118 may wait a predetermined time to receive an acknowledgment that its transmitted data was received successfully and, in the absence of such an acknowledgement, the transmitter 118 may re-transmit the data. In order to avoid data from the same two or more transmitters 118 arriving at the central receiver at the same time following retransmission, the predetermined time that each transmitter 118 waits before re-transmitting data may be different from the predetermined times waited by other transmitters 118. Each receiver 120 may wait a random amount of time before re-transmitting data.

The central receiver may broadcast requests for data to be resent, or may address requests to individual transmitters 118, using the electric power grid 100. The central receiver may send such requests to send data and/or acknowledgements that data has been received successfully via a separate reverse channel.

In some embodiments, the central receiver may form groups of transmitters 118 that are to transmit data to the central receiver within a given time-frame, and may reformulate the groups in response to failed transmissions caused by transmissions from two or more transmitters 118 being received at the central receiver at the same time and/or using the same code.

Although specific examples of how the receivers 120 are synchronized are described above, it is to be understood that the receivers 120 may be synchronized using different timing techniques.

Although in the above description, transmitted data is described in terms of high and low states, it is to be understood that in some embodiments data structures with multiple data states may be used. For example, as well as the high and low states, there may be one or more intermediate states.

It is to be understood that the functionality of the receivers, the transmitters, and the controller described above may be implemented in software running on a processor. The software may be pre-programmed on the respective devices at the time of manufacture or installation, or might be provided separately and installed on the respective devices.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of decoding, at a receiving device, information encoded in a frequency modulation of a grid frequency of electricity flowing in a synchronous area of an electric power grid, the grid frequency subject to a magnitude of noise fluctuations which vary the grid frequency within a grid frequency range, the method comprising:
    measuring, at the receiving device, a characteristic of the grid frequency to obtain a grid frequency signal, the grid frequency signal comprising a magnitude of the frequency modulation of the grid frequency that is smaller than the magnitude of noise fluctuations of the grid frequency;
    accessing data indicative of a plurality of predetermined code patterns, each of the plurality of code patterns representing a plurality of bits of data;
    performing a correlation process, at the receiving device, to determine a correlation between at least a portion of the grid frequency signal and at least one of the plurality of predetermined code patterns; and
    decoding the encoded information on the basis of the determined correlation.

2. The method of claim 1, wherein the receiving device comprises a data store storing the one or more predetermined code patterns, and the method comprises accessing the data store to access the one or more predetermined code patterns.

3. The method of claim 1, wherein the receiving device comprises a data store storing one or more identifiers, and said frequency modulation includes an identifier of a receiving device or group of receiving devices, the method comprising:
    determining whether the identifier included in the frequency modulation corresponds to one or more of the one or more identifiers stored in the data store; and
    processing the grid frequency signal on the basis of the determination.

4. The method of claim 2, wherein said decoding comprises extracting data from the signal in response to determining that the identifier included in the signal corresponds to one or more of the one or more identifiers stored in the data store.

5. The method of claim 4, wherein said receiving device comprises a data store comprising data indicating one or more predefined actions, and the method comprises performing said one or more predefined actions in response to a determination that the identifier included in the frequency modulation corresponds to one or more of the one or more identifiers stored in the data store.

6. The method of claim 5, wherein the one or more predefined actions include one or more of: altering a setting of the receiving device; altering a setting of a power device associated with the receiving device; executing a program on the receiving device; stopping a program on the receiving device; and storing data in a data store of the receiving device.

7. The method of claim 1, wherein the frequency modulation comprises timing information and further information, different from the timing information, and the method comprises processing the further information on the basis of the timing information.

8. The method of claim 7, wherein the frequency modulation comprises a phase shift key, and the method comprises extracting said timing information from the frequency modulation on the basis of the phase shift key.

9. The method of claim 1, comprising:
    monitoring, at the receiving device, a number of cycles of the electric power flow in the grid that have elapsed from a given start point; and
    determining timing information for the correlation process on the basis of said monitoring.

10. The method of claim 9, comprising:
    performing the correlation process according to a predetermined schedule, said schedule identifying a timing for the performance of the correlation process on the basis of the number of cycles of the electric power flow that have elapsed from the given start point.

11. The method of claim 9, wherein frequency modulation comprises information indicating the number of cycles of said electric power flow that have elapsed from the given start point.

12. The method of claim 1, wherein the correlation process comprises a filtering process.

13. The method of claim 1, wherein the correlation process comprises correlating a time-base of the frequency modulation with a time-base of the one or more predetermined code patterns.

14. The method of claim 1, wherein the correlation process comprises correlating a bit pattern of the frequency modulation with a bit pattern of the one or more predetermined code patterns.

15. The method of claim 1, wherein correlation process comprises extracting data transmitted by a plurality of transmitting devices and determining from which of the plurality of transmitting devices the extracted data was transmitted.

16. The method of claim 15, wherein data transmitted by different ones of the plurality of transmitting devices is received at the receiving device at different times.

17. The method of claim 15, comprising maintaining a database storing identifiers of the plurality of transmitting devices and comparing identification data extracted from the frequency modulation with said stored identifiers of the plurality of transmitting devices.

18. The method of claim 17, comprising:
determining that data is received from two or more of the plurality of transmitting devices within a predefined time-frame; and
transmitting a request to each of said two or more transmitting devices to retransmit said data in response to determining that data has been received from said two or more receiving devices within said time-frame.

19. The method of claim 17, comprising transmitting an acknowledgement to a given one of the plurality of transmitting devices in response to determining that data has been received from that transmitting device.

20. The method of claim 1, wherein the receiving device comprises a communications interface for receiving communications via a further communications medium, different from the electric power grid, and the method comprises initiating communications with a further device via the further communications medium in response to decoding of said information.

21. The method of claim 20, wherein the frequency modulation comprises authentication data for authenticating the receiving device to the further device to initiate communications via the further communications medium.

22. The method of claim 21, comprising transmitting the authentication data from the receiving device to the further device to initiate communications via the further communications medium.

23. The method of claim 20, wherein the frequency modulation comprises configuration data for configuring the receiving device to receive data from the further device via the further communications medium.

24. The method of claim 20, wherein the further communications medium is an Internet Protocol (IP) based communications medium.

25. The method of claim 1, wherein the receiving device comprises a communications interface for communications via a further communications medium, different from the electric power grid, and the method comprises:
sending a request message to a further device via the communications medium to initiate communications therewith, whereby said further device initiates said frequency modulation to encode said information for decoding by the receiving device; and
the receiving device communicating with the further device via the communications medium on the basis of the decoded information.

26. The method according to claim 1, wherein the correlation process comprises determining a probability that the at least a portion of the grid frequency signal corresponds to a predetermined code pattern of the plurality of predetermined code patterns.

27. The method according to claim 1, wherein the magnitude of the frequency modulation of the grid frequency is smaller than 200 mHz.

28. A receiving device for decoding information encoded in a frequency modulation of a grid frequency of electricity flowing in a synchronous area of an electric power grid, the grid frequency subject to a magnitude of noise fluctuations which vary the grid frequency within a grid frequency range, the receiver comprising:
a measuring circuit arranged to measure a characteristic relating to the grid frequency to obtain a grid frequency signal, the grid frequency signal comprising a magnitude of the frequency modulation of the grid frequency that is smaller than the magnitude of noise fluctuations of the grid frequency;
access to a data store arranged to store data indicative of a plurality of predetermined code patterns, each of the plurality of code patterns representing a plurality of bits of data;
a processing circuit arranged to perform a correlation process to determine a correlation between at least a portion of the grid frequency signal and at least one of the plurality of predetermined code patterns, and to decode the encoded information on the basis of the determined correlation.

29. A non-transitory computer-readable storage medium comprising computer-executable instructions which, when executed by a processor, cause a computing device to perform a method of decoding, at a receiving device, information encoded in a frequency modulation of a grid frequency of electricity flowing in a synchronous area of an electric power grid, the grid frequency subject to a magnitude of noise fluctuations which vary the gild frequency within a grid frequency range, the method of decoding comprising:
measuring, at the receiving device, a characteristic of the grid frequency to obtain a grid frequency signal, the grid frequency signal comprising a magnitude of the frequency modulation of the grid frequency that is smaller than the magnitude of noise fluctuations of the grid frequency;
accessing data indicative of one or more predetermined code patterns, each of the plurality of code patterns representing a plurality of bits of data;
performing a correlation process, at the receiving device, to determine a correlation between at least a portion of the grid frequency signal and at least one of the plurality of predetermined code patterns; and
decoding the encoded information on the basis of the determined correlation.

30. A method of transmitting information within a synchronous area of an electric power grid, the electric power grid comprising one or more power devices arranged to provide electric current to and/or consume electric current from the electric power grid via respective one or more connections between the power devices and the electric grid, electricity flowing in the electric power grid in accordance with a grid frequency, the grid frequency subject to a magnitude of noise fluctuations which vary the grid frequency within a grid frequency range, the method comprising:

modulating, using one or more modulating devices at the one or more connections, a flow of power between the electric power grid and the one or more power devices in accordance with a control pattern representing information to be transmitted, the modulating resulting in a corresponding variation in power balance in the electric power grid, the variation in power balance causing a frequency modulation pattern superimposed on the grid frequency, the frequency modulation pattern corresponding to the control pattern and comprising a magnitude of the frequency modulation pattern of the grid frequency that is smaller than the magnitude of noise fluctuations of the grid frequency.

31. The method of claim 30, in which each of a distributed group of power devices is connected to the electric power grid, and the method comprises:

modulating power flow to and/or from each of the plurality of power devices in accordance with the control pattern, such that the consumption and/or provision of power by the plurality of power devices is coordinated to induce a collective modulation in the grid frequency that is detectable by the one or more receiving devices.

32. The method of claim 30, comprising:

receiving, from a controller arranged to generate data indicative of the information that is to be transmitted across the electric power grid, first data indicative of first information to be transmitted; and generating the control pattern on the basis of the received first data.

33. The method of claim 32, in which data from the controller is received via an external communications network.

34. The method of claim 30, comprising including in said modulation in the grid frequency one or more identifiers corresponding to said one or more receiving devices.

35. The method of claim 30, in which the control pattern represents a sequence of control signals for controlling a switch, the switch being arranged to turn power flow to and/or from the power device on or off in accordance with a said control signal, and the method comprises controlling the switch in accordance with the sequence of control signals.

36. The method of claim 30, comprising controlling an attenuator to modulate power flow to and/or from the power unit.

37. The method of claim 30, wherein said modulation of power flow comprises modulating a reactive power flow.

38. The method of claim 30, wherein said control pattern defines a bit pattern of data, and the modulation in the grid frequency comprises a digital signal.

39. The method of claim 30, wherein the modulation in the grid frequency comprises an analogue signal.

40. The method of claim 30, wherein the modulation in the grid frequency includes identification data relating to a specific receiving device to which information is to be transmitted.

41. The method of claim 40, wherein the identification data is only available to the one or more power devices and to said specific receiving device.

42. The method of claim 40, wherein the identification data comprises a plurality of identifier types, each identifier type relating to a different property of the receiving device.

43. The method of claim 42, wherein the plurality of identifier types include one or more of: a geographical location, a device operating characteristic, an ownership group, a network address, a network address range, a telephone area code and a telephone number.

44. The method of claim 30, wherein each of the one or more power devices provide non-spinning power generation for the electric power grid.

45. The method of claim 30, wherein each of the one or more power devices is a power consuming device.

46. The method of claim 30, wherein the grid frequency is subject to random noise fluctuations such that the grid frequency varies over time within a frequency range, and the method comprises modulating the power flow between the electric power grid and the one or more power devices to provide a frequency modulation having a frequency variation with respect to the grid frequency that is less than said frequency range.

47. A method of transmitting information within a synchronous area of an electric power grid, wherein each of a distributed group of power devices is connected to the electric power grid via respective connections between the power devices and the electric grid, the grid frequency subject to a magnitude of noise fluctuations which vary the grid frequency within a grid frequency range, the method comprising:

modulating, using one or more modulating devices at the one or more connections, a flow of power between each of said power devices and the electric power grid in accordance with a control pattern representing information to be transmitted, the modulating resulting in a corresponding variation in power balance in the electric power grid, the variation in power balance causing a frequency modulation pattern superimposed on a grid frequency to provide a frequency modulation corresponding to the control pattern, the frequency modulation comprising a magnitude of the frequency modulation of the grid frequency that is smaller than the magnitude of noise fluctuations of the grid frequency, wherein modulating the flow of power between each of said power devices and the electric power grid comprises modulating a flow of power between a first one of the plurality of power devices and the electric power grid at a different time to modulating a flow of power between a second one of the plurality of power devices and the electric power grid.

48. A method of transmitting information within a synchronous area of an electric power grid, the electric power grid being connected to a plurality of distributed power devices arranged to consume electric power from the electric power grid, electricity flowing in the electric power grid in accordance with a grid frequency, the grid frequency subject to a magnitude of noise fluctuations which vary the grid frequency within a grid frequency range, the method comprising:

modulating power flow to the distributed power devices in accordance with a control pattern representing information to be transmitted, the modulating resulting in a corresponding variation in power balance in the electric power grid, the variation in power balance causing a frequency modulation pattern superimposed on the grid frequency to provide a frequency modulation corresponding to the control pattern for receipt at one or more receiving devices arranged to detect a frequency modulation in the grid frequency, the frequency modulation comprising a magnitude of the frequency modulation of the grid frequency that is smaller than the magnitude of noise fluctuations of the grid frequency.

49. A method of transmitting information within a synchronous area of an electric power grid, the electric power grid comprising one or more power devices arranged to provide non-spinning electric power generation for the electric power grid and/or consume electric power from the electric power grid, electricity flowing in the electric power grid in accordance with a grid frequency, the grid frequency subject to a magnitude of noise fluctuations which vary the grid frequency within a grid frequency range, the method comprising:

modulating power flow to and/or from one or more power devices in accordance with a control pattern representing information to be transmitted, the modulating resulting in a corresponding variation in power balance in the electric power grid, the variation in power balance causing a modulation in the grid frequency to provide a frequency modulation corresponding to said information for receipt at one or more receiving devices arranged to detect a frequency modulation in the grid frequency, the frequency modulation comprising a magnitude of the frequency modulation of the grid frequency that is smaller than the magnitude of noise fluctuations of the grid frequency.

50. A device for use in transmitting information within a synchronous area of an electric power grid, the electric power grid comprising one or more power devices arranged to provide electric current to and/or consume electric current from the electric power grid via respective one or more connections between the power devices and the electric grid, electricity flowing in the electric power grid in accordance with a grid frequency, the grid frequency subject to a magnitude of noise fluctuations which vary the grid frequency within a grid frequency range, the device comprising:

a communications interface arranged to receive data corresponding to information that is to be transmitted to a receiver connected to said synchronous area of the power grid;

a processor arranged to generate, on the basis of the received data, a sequence of control signals corresponding to the information that is to be transmitted; and a power flow modulator at the one or more connections arranged to modulate, on the basis of the generated sequence of control signals, a flow of power between the electric power grid and the one or more power devices, the modulating resulting in a corresponding variation in power balance in the electric power grid, the variation in power balance causing a frequency modulation pattern superimposed on the grid frequency to provide a frequency modulation corresponding to the information to be transmitted, the frequency modulation comprising a modulation of the grid frequency that is smaller than the magnitude of noise fluctuations of the grid frequency.

51. A non-transitory computer-readable storage medium comprising computer-executable instructions which, when executed by a processor, cause a computing device to perform a method of transmitting information within a synchronous area of an electric power grid, the electric power grid comprising one or more power devices arranged to provide electric current to and/or consume electric current from the electric power grid via respective one or more connections between the power devices and the electric grid, electricity flowing in the electric power grid in accordance with a grid frequency, the grid frequency subject to a magnitude of noise fluctuations which vary the grid frequency within a grid frequency range, the method of transmitting information comprising:

modulating, using modulating devices at the one or more connections, a flow of power between the electric power grid and the one or more power devices in accordance with a control pattern representing information to be transmitted, the modulating resulting in a corresponding variation in power balance in the electric power grid, the variation in power balance causing a frequency modulation pattern superimposed on the grid frequency to provide a frequency modulation corresponding to the information to be transmitted the frequency modulation comprising a modulation of the grid frequency that is smaller than the magnitude of noise fluctuations of the grid frequency.

* * * * *